(12) United States Patent
Schubert et al.

(10) Patent No.: US 9,464,895 B2
(45) Date of Patent: Oct. 11, 2016

(54) REMOTE LEVELING AND POSITIONING SYSTEM AND METHOD

(71) Applicant: OTL Dynamics LLC, Vashon Island, WA (US)

(72) Inventors: Richard S. Schubert, Vashon Island, WA (US); Robert P. Donker, Burton, WA (US)

(73) Assignee: OTL DYNAMICS LLC, Vashon Island, WA (US)

( * ) Notice: Subject to any disclaimer, the term of this patent is extended or adjusted under 35 U.S.C. 154(b) by 0 days.

(21) Appl. No.: 14/259,865

(22) Filed: Apr. 23, 2014

(65) Prior Publication Data

US 2014/0237833 A1 Aug. 28, 2014

Related U.S. Application Data

(63) Continuation-in-part of application No. 13/212,989, filed on Aug. 18, 2011, now Pat. No. 8,959,784, and a continuation-in-part of application No. 12/724,326, filed on Mar. 15, 2010, now Pat. No. 8,006,397.

(60) Provisional application No. 61/159,968, filed on Mar. 13, 2009.

(51) Int. Cl.

| | |
|---|---|
| *G01C 9/06* | (2006.01) |
| *G01C 15/02* | (2006.01) |
| *G01C 15/00* | (2006.01) |
| *G01C 9/10* | (2006.01) |
| *G01C 9/24* | (2006.01) |

(52) U.S. Cl.
CPC ............. *G01C 15/004* (2013.01); *G01C 9/06* (2013.01); *G01C 9/10* (2013.01); *G01C 9/24* (2013.01); *G01C 15/00* (2013.01)

(58) Field of Classification Search
CPC ........ G01C 15/004; G01C 9/02; G01C 9/00; G01C 9/06
USPC .......... 33/370, 371, 372, 373, 365, 567, 286
See application file for complete search history.

(56) References Cited

U.S. PATENT DOCUMENTS

| | | |
|---|---|---|
| 1,794,254 A | 2/1931 | Sherwood |
| 2,535,791 A | 12/1950 | Fluke |
| 2,755,561 A | 7/1956 | LaFosse |
| 3,368,287 A | 2/1968 | Ault |
| 3,707,772 A | 1/1973 | Cotter |
| 4,295,279 A * | 10/1981 | Sienknecht ............. G01C 9/28 227/156 |
| 4,333,244 A | 6/1982 | Bailey |
| 4,593,475 A | 6/1986 | Mayes |

(Continued)

OTHER PUBLICATIONS

USPTO, Office Action dated Mar. 24, 2011 for U.S. Appl. No. 12/724,326, filed Mar. 15, 2010.

(Continued)

*Primary Examiner* — Christopher Fulton
(74) *Attorney, Agent, or Firm* — Davis Wright Tremaine LLP

(57) ABSTRACT

Systems and methods are provided herein that provide for remote leveling and positioning. An embodiment includes a leveling device assembly. Another embodiment provides a system including a leveling device assembly and a plurality of audio devices. Further embodiments provide for systems having a plurality of leveling device assemblies and appliances that are configured to couple with the leveling device assembly.

16 Claims, 32 Drawing Sheets

(56) References Cited

U.S. PATENT DOCUMENTS

| | | | |
|---|---|---|---|
| 4,663,856 A * | 5/1987 | Hall | G01C 9/28 33/373 |
| 4,976,040 A * | 12/1990 | Mish | G01C 9/28 33/372 |
| 5,031,329 A | 7/1991 | Smallidge | |
| 5,109,609 A * | 5/1992 | Anderson | G01B 3/30 33/501.05 |
| 5,255,443 A * | 10/1993 | Schmidt | G01C 9/28 33/373 |
| 5,388,337 A | 2/1995 | Powers, II | |
| 5,442,864 A * | 8/1995 | Erman | G01C 9/26 33/370 |
| 5,531,031 A * | 7/1996 | Green | G01C 15/008 33/281 |
| 5,594,669 A | 1/1997 | Heger | |
| 5,813,125 A | 9/1998 | Byrn | |
| 5,992,033 A | 11/1999 | Scarborough | |
| 5,996,238 A | 12/1999 | Yonke | |
| 6,182,916 B1 | 2/2001 | Lin | |
| 6,279,239 B1 * | 8/2001 | Astudillo | G01C 15/105 33/276 |
| 6,354,011 B1 | 3/2002 | Albrecht | |
| 6,442,853 B1 * | 9/2002 | Hale | E04F 21/0007 33/194 |
| 6,502,322 B2 | 1/2003 | Smochek | |
| 6,836,972 B2 | 1/2005 | Drahos et al. | |
| 6,915,587 B1 | 7/2005 | Scillia et al. | |
| 6,918,187 B2 | 7/2005 | Schaefer | |
| 7,117,606 B2 | 10/2006 | Brown | |
| 7,237,341 B2 | 7/2007 | Murray | |
| 7,389,591 B2 | 6/2008 | Jaiswai et al. | |
| 7,513,055 B2 | 4/2009 | Montgomery | |
| 7,644,506 B2 | 1/2010 | Wong | |
| 7,726,039 B2 | 6/2010 | Lee et al. | |
| 8,006,397 B2 | 8/2011 | Schubert | |
| 8,336,221 B2 | 12/2012 | Steele et al. | |
| 8,484,856 B1 * | 7/2013 | Webb | G01C 9/26 33/371 |
| 8,959,784 B2 * | 2/2015 | Schubert | G01C 9/06 33/333 |
| 2005/0262717 A1 | 12/2005 | Chen | |
| 2007/0045010 A1 | 3/2007 | Kasperek | |
| 2007/0079516 A1 * | 4/2007 | Eckstein | G01C 15/004 33/286 |
| 2007/0130785 A1 | 6/2007 | Bublitz et al. | |
| 2007/0180720 A1 * | 8/2007 | Gorgone | G01C 9/02 33/382 |

OTHER PUBLICATIONS

USPTO, Office Action dated May 29, 2013 for U.S. Appl. No. 13/212,989, filed Aug. 18, 2011.

* cited by examiner

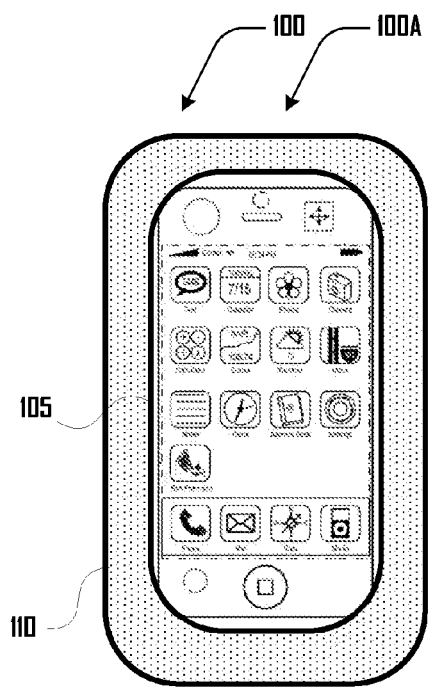
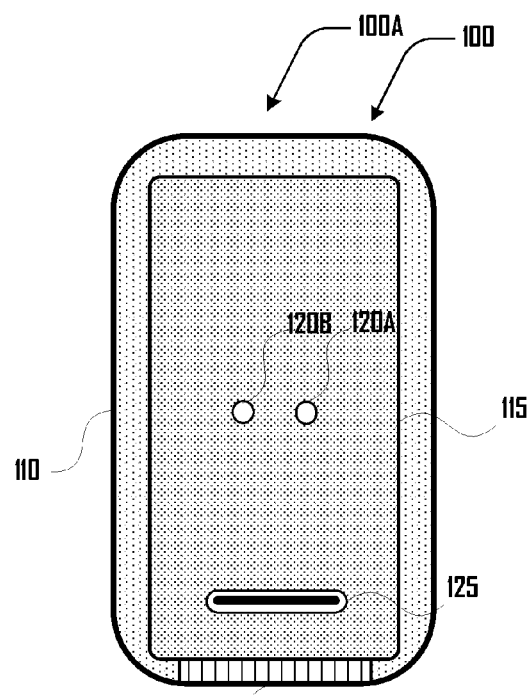
Fig.1a  Fig.1b
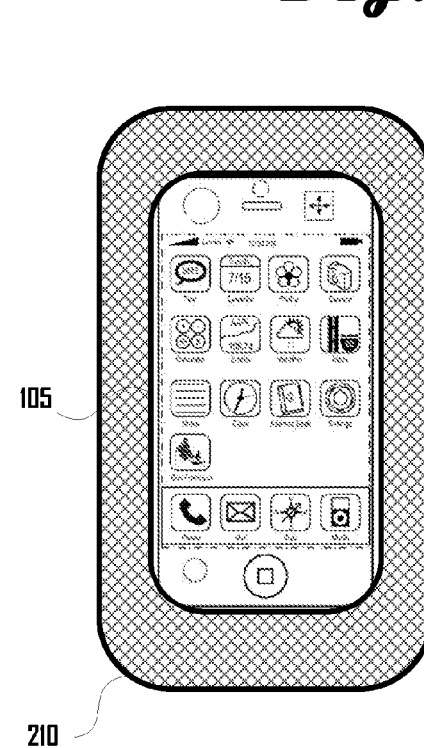
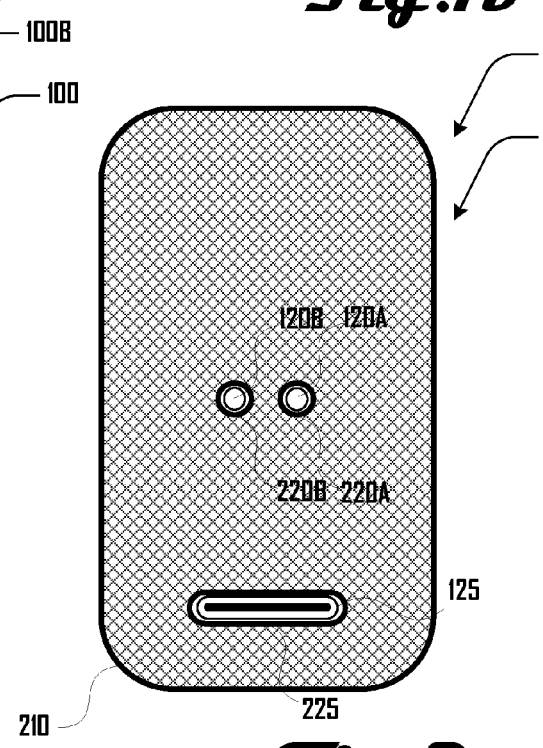
Fig.2a  Fig.2b

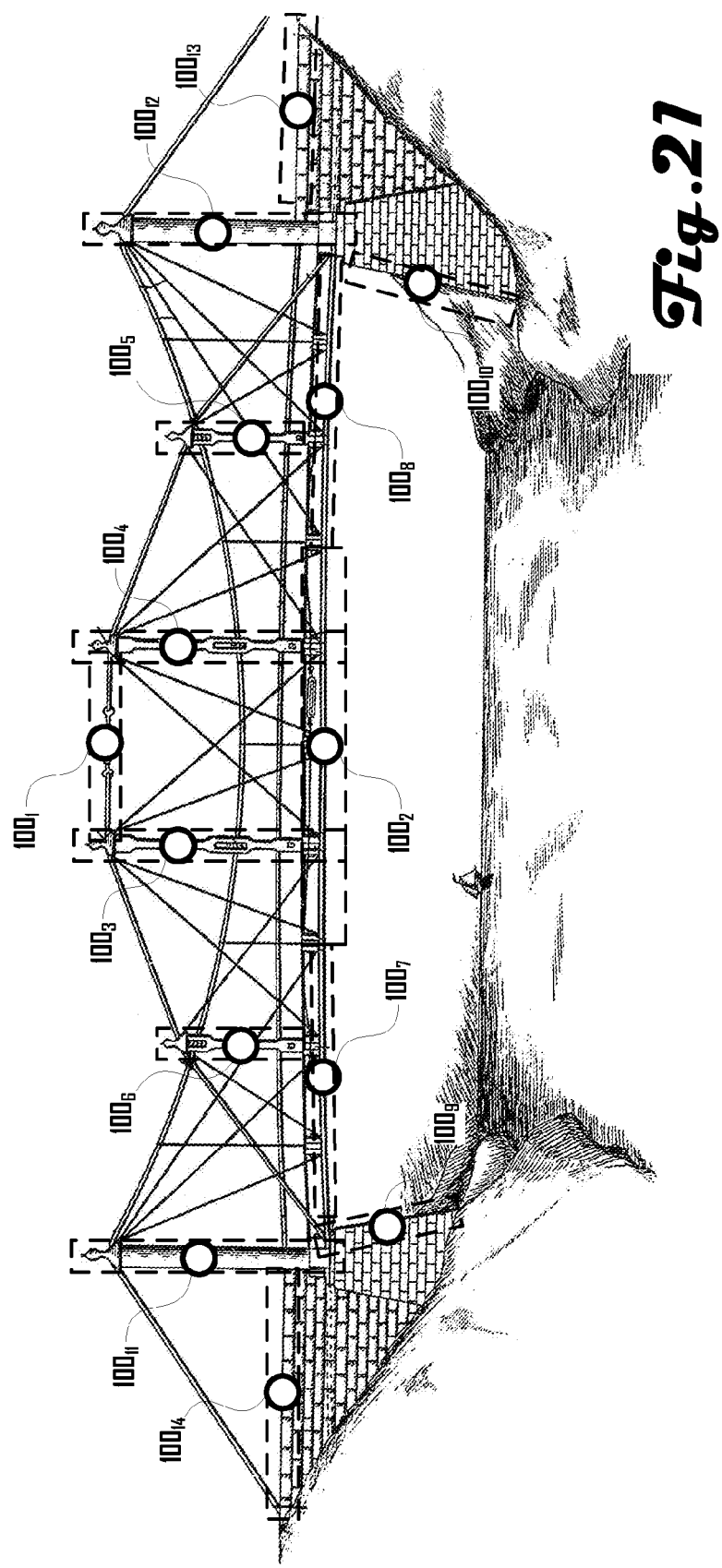

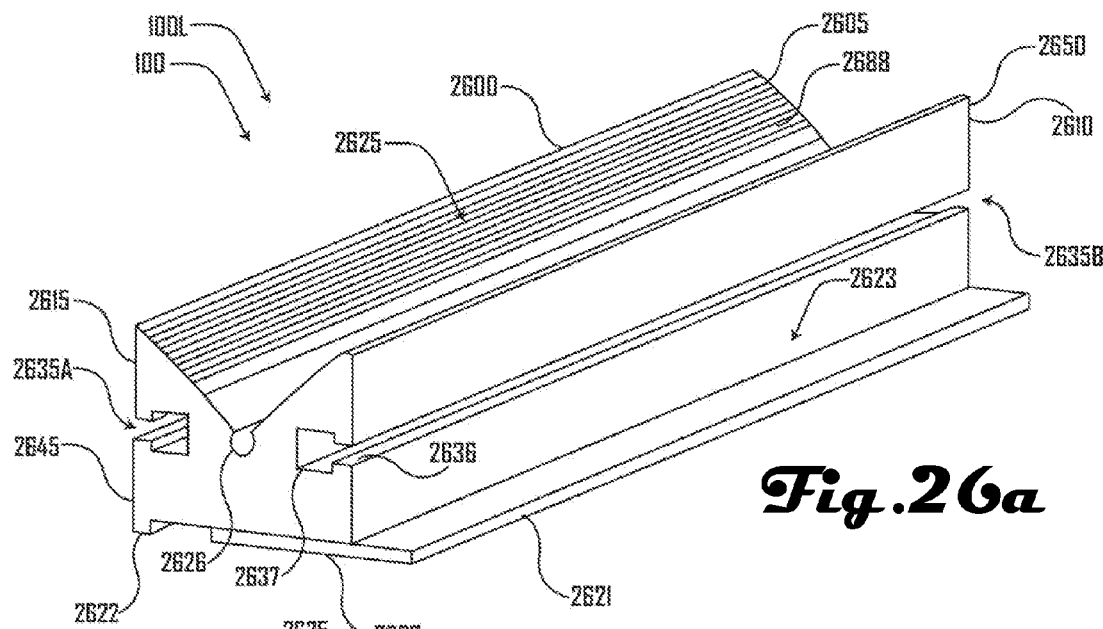
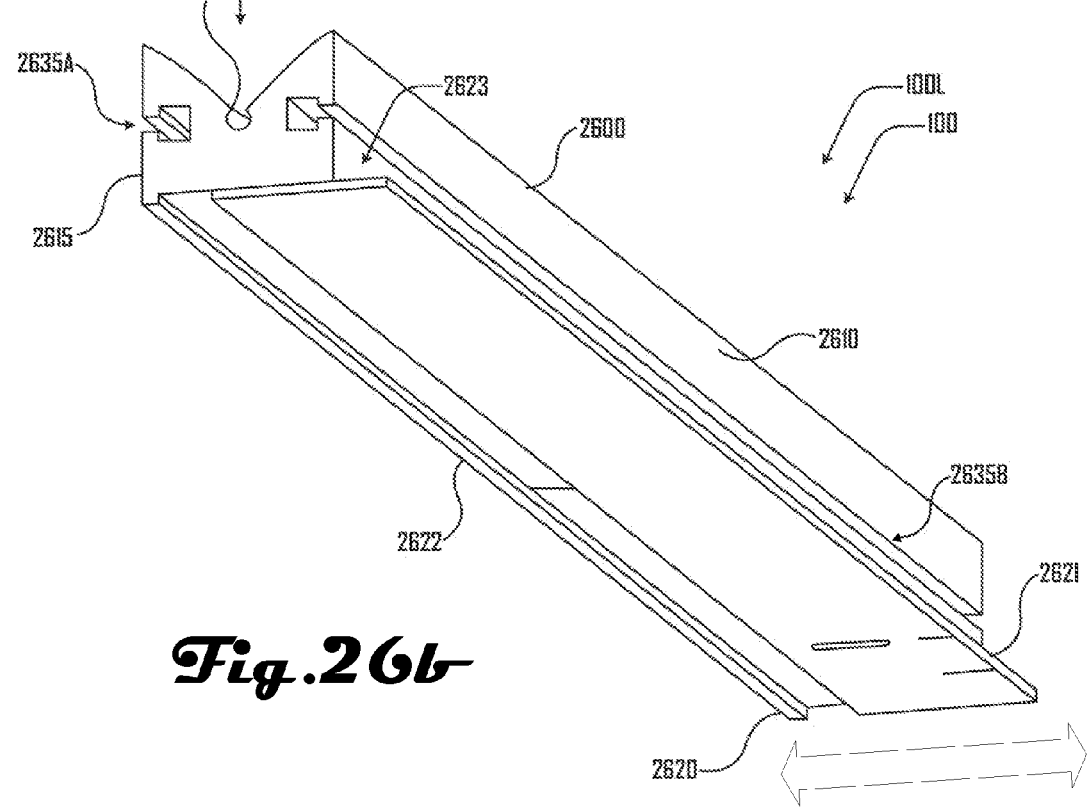

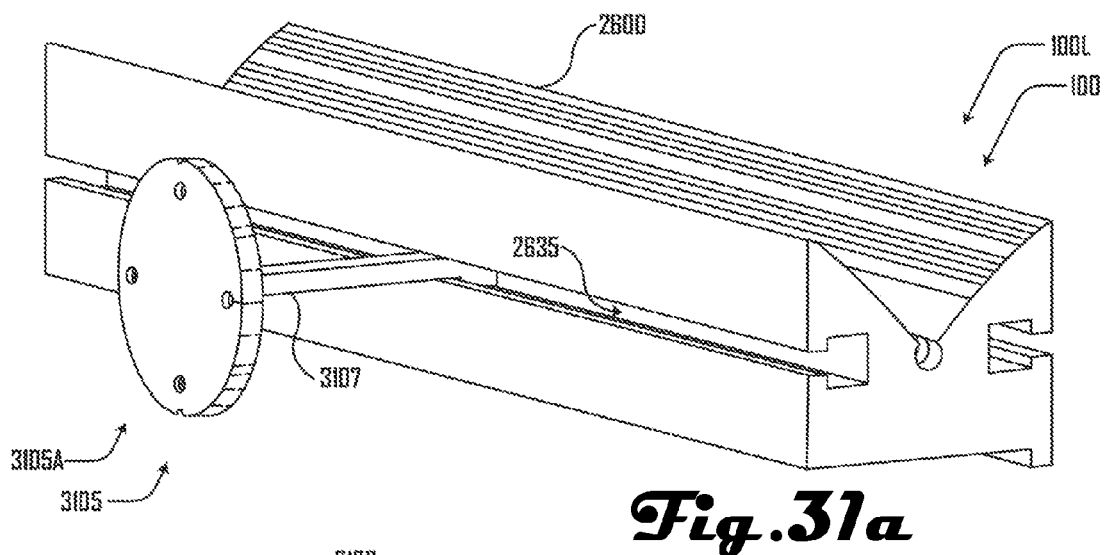
Fig.31a
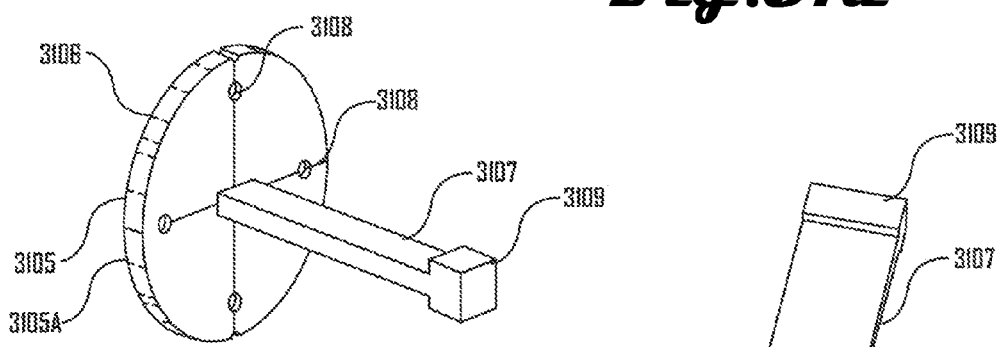
Fig.31b
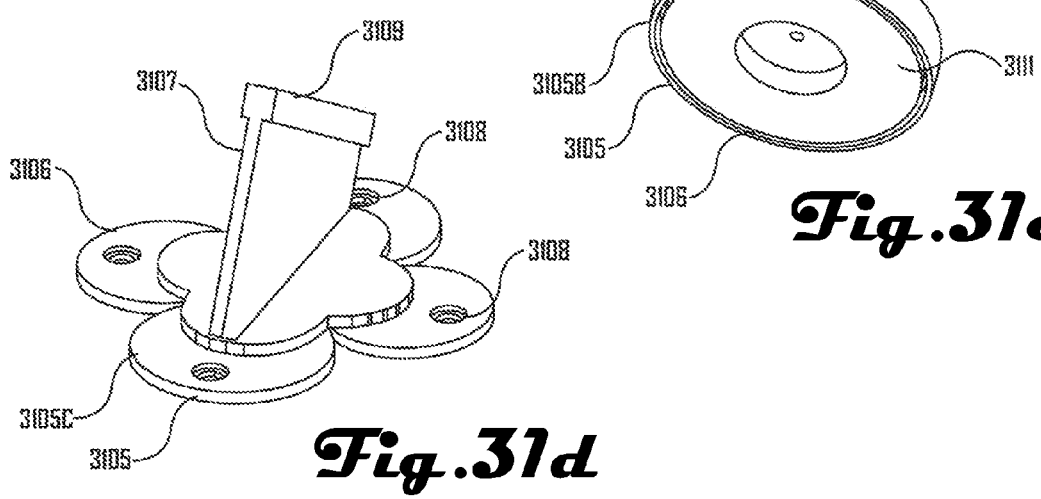
Fig.31c
Fig.31d

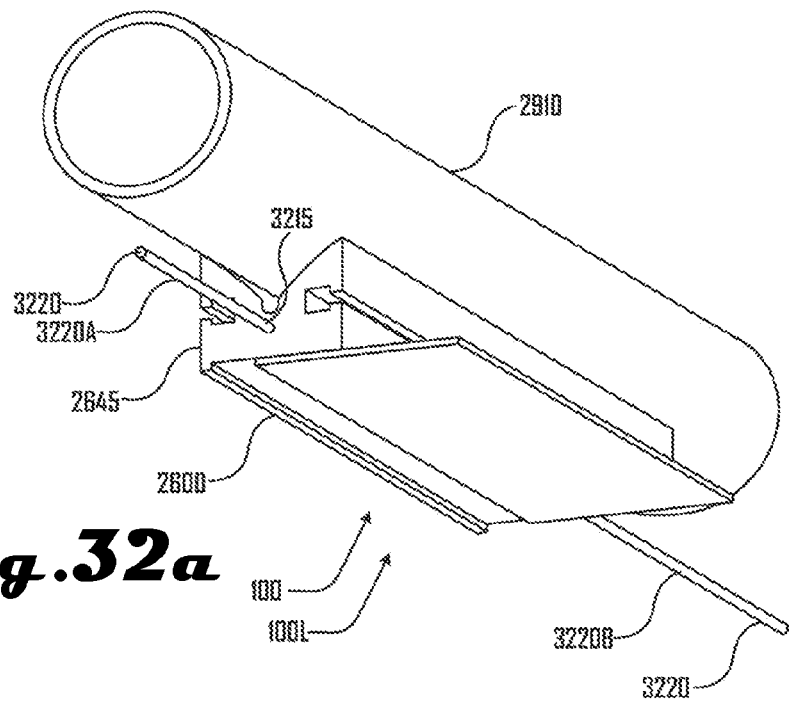
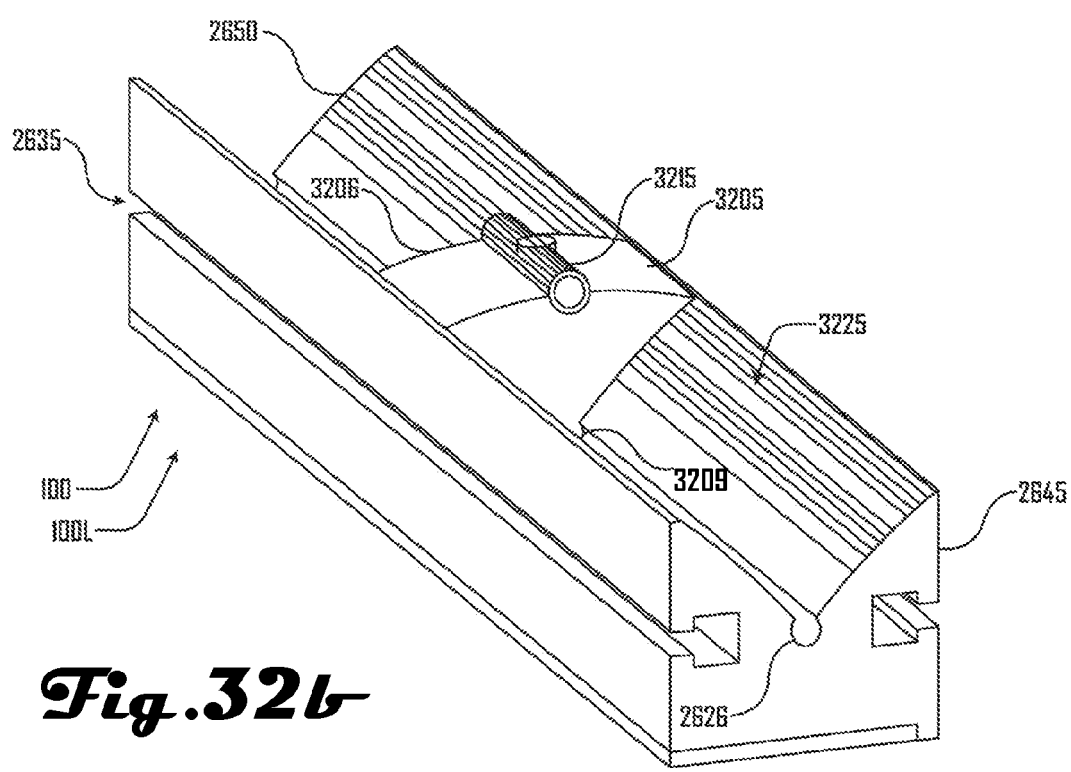

REMOTE LEVELING AND POSITIONING SYSTEM AND METHOD

PRIORITY CLAM

This application is a continuation-in-part of U.S. Non-provisional application Ser. No. 13/212,989 filed Aug. 18, 2011 (issued as U.S. Pat. No. 8,959,784) which is a continuation-in-part of U.S. Non-provisional application Ser. No. 12/724,326 filed on Mar. 15, 2010 (issued as U.S. Pat. No. 8,006,397) that claims the benefit of priority of U.S. Provisional Application No. 61/159,968 filed on Mar. 13, 2009. This application is also related to application Ser. No. 13/623,781 filed Sep. 12, 2012 (issued as U.S. Pat. No. 8,869,412). All of these applications are incorporated herein by reference in their entireties for all purposes.

FIELD

This invention relates generally to leveling and positioning, and more specifically, to systems and methods for remote leveling and positioning.

BACKGROUND

Leveling is the positioning of a plane of an object perpendicular to the gravitational axis of the earth; whereas a plane is plumb when it is parallel to the earth's gravitational axis. For example, in a household setting, people typically prefer to level pictures, mirrors, and other framed objects so that these objects are parallel to the floor, ceiling and walls of a house, which are presumed to be level themselves. In a construction setting, numerous structural elements must be leveled to satisfy building codes and esthetic preferences. For example, as discussed above, leveling of framed objects requires that structures of a home be themselves level, which must be done during construction.

Positioning is the placement of an object, which may include its position in three dimensional space, or a rotational orientation. In some situations, positioning may include leveling. An example of positioning may include locating an object a certain distance from another object, orienting an object toward a compass point, locating the object a certain distance from sea level or ground level, and the like.

Various devices and methods can be used to level or position an object. One exemplary leveling device is a bubble or spirit level, which is a transparent and slightly curved vial that is incompletely filled with liquid. The resultant bubble in this vial settles to the center of the vial, when the vial is level.

While this is a typical device used to level or plumb objects, it is deficient because a user must be able to see the position of the bubble in order to properly use the instrument, and being at a distance, at certain angles, and having an obstructed view makes bubble levels unusable. Unfortunately, this substantially limits the use of such a device in many settings.

Additionally, in situations where a plurality of users is leveling an object, using a bubble level device can be cumbersome because at least one user must read the level and relay instructions to others. This is not efficient when an object is heavy or when it is not easy for users to view the bubble level while working.

BRIEF DESCRIPTION OF THE DRAWINGS

The present invention will be described by way of exemplary embodiments illustrated in the accompanying drawings in which like references denote similar elements, and in which:

FIG. 1a is a front view of a leveling device assembly in accordance with an embodiment.

FIG. 1b is a back view of the leveling device assembly in accordance with an embodiment.

FIG. 2a is a front view of a further leveling device assembly in accordance with an embodiment.

FIG. 2b is a back view of the further leveling device assembly in accordance with an embodiment.

FIG. 21 is a side view of a bridge having a network of interconnected leveling devices positioned thereabout.

FIGS. 26a and 26b depict an embodiment of a leveling device housing in accordance with a further embodiment.

FIGS. 31a-d depict various embodiments of a coupling base.

FIGS. 32a and 32b depict embodiments of laser assemblies associated with the housing of FIGS. 26a and 26b.

DESCRIPTION

Figure 3A:
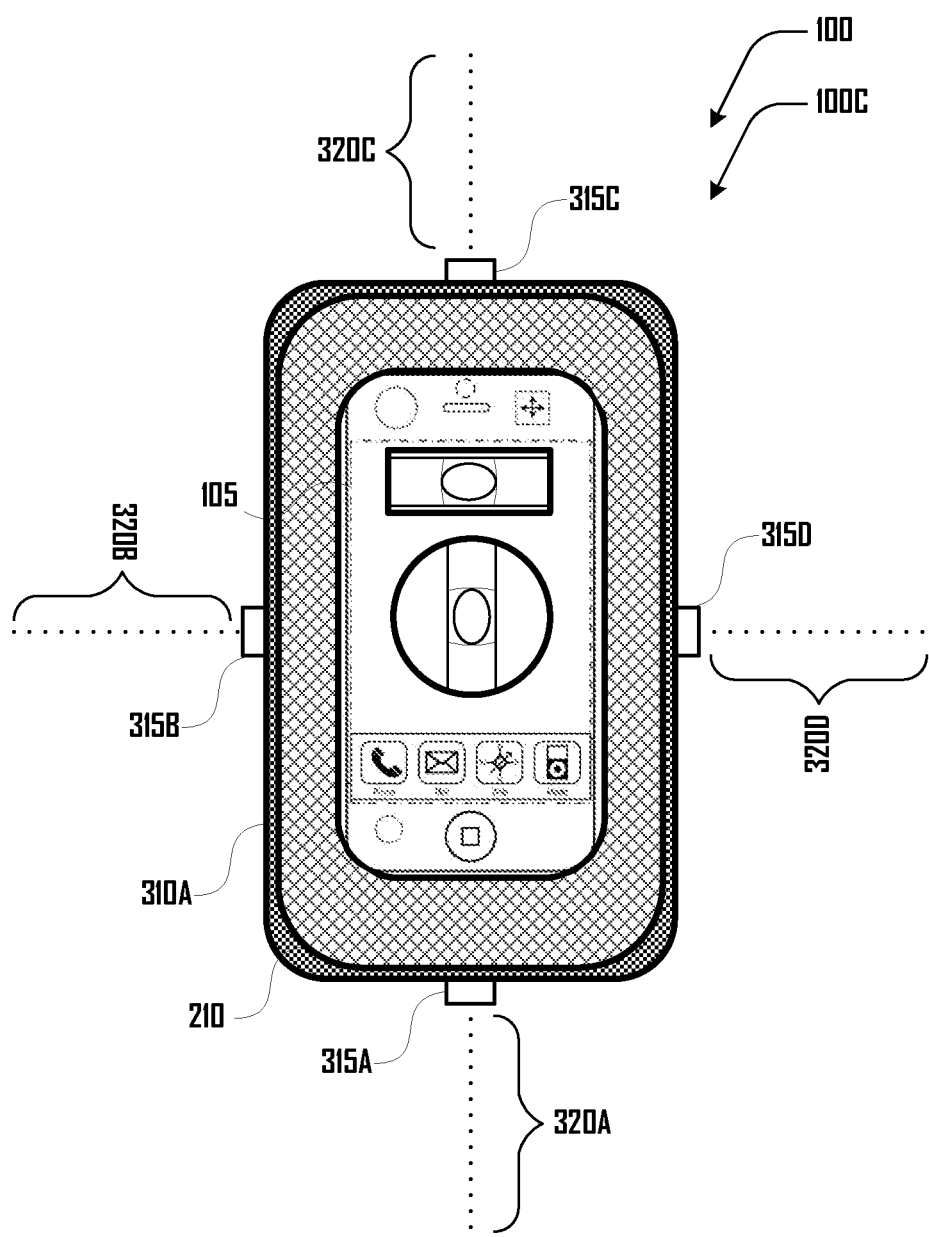
FIG. 3a is a top view of a leveling device assembly comprising lasers, in accordance with an embodiment.

Illustrative embodiments presented herein include, but are not limited to, systems and methods for remote leveling and positioning. Some embodiments are directed to a housing or assembly of a leveling device.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

Further, various operations and/or communications will be described as multiple discrete operations and/or communications, in turn, in a manner that is most helpful in understanding the embodiments described herein; however, the order of description should not be construed as to imply that these operations and/or communications are necessarily order dependent. In particular, these operations and/or communications need not be performed in the order of presentation.

The term "embodiment" is used repeatedly. The phrase generally does not refer to the same embodiment; however, it may. The terms "comprising," "having" and "including" are synonymous, unless the context dictates otherwise. Additionally, various embodiments discussed herein are directed towards leveling, however, these embodiments can equally relate to plumbing or achieving a plumb state.

Various embodiments described herein relate to leveling devices, which may include a housing and electronic components. In various embodiment, the housing and one or more electronic components of a leveling device may be separable, either alone or in combination. For example, electronic components of a leveling device may be disposed on one or more circuit board that this separable from a housing. In some embodiments, a stand-alone device may be disposed within a housing. For example, a smart-phone may be disposed within a housing. In some embodiments, electronic various components may be integrally disposed within a housing. While some embodiments may describe one or more of these housing and electronic component configurations, any of the embodiments described herein may be suitably modified to conform to any of the above housing and electronic component configurations, or the like. Accordingly, the following disclosure should not be interpreted to be limiting in terms of housing and electronic component configuration.

Moreover, any of the capabilities, functionalities, or features of the embodiments described herein may be suitably applied to, or combined with, other embodiments, or may be removed from an embodiment. Accordingly, the following disclosure should not be interpreted to be limiting in terms of specific combinations of capabilities, functionalities, or features. The example embodiments described herein merely illustrate some of the numerous possible combinations of capabilities, functionalities, or features, which are within the scope and spirit of the invention.

Various embodiments disclosed herein may utilize one or more wireless network or wireless protocol. One or more wireless network may be used to operatively inter-connect two or more device disclosed herein, or may be used to operatively connect one or more device disclosed herein with another suitable device, network, or server. In some embodiments, peer-to-peer wireless connections may be established comprising two or more devices.

For example, in an embodiment, a suitable network may comprise MeshDynamics™ Smart Multi-Grid™ wireless technology, such as MD4000 modular and interoperable products, or the like (MeshDynamics Inc., Santa Clara, Calif.). In one embodiment, a suitable network may comprise ZigBee™ devices, may utilize ZigBee™ protocols, or the like (ZigBee Alliance, San Ramone, Calif.). In one embodiment, a suitable network may comprise Bluetooth™ devices, may utilize Bluetooth™ protocols, or the like (Bluetooth Special Interest Group, Kirkland, Wash.).

While some example embodiment described herein may be described as using one or more specific type of network, the present disclosure should not be construed to limit the number of types of networks, wireless or otherwise, that may be employed in various embodiments. Accordingly, the example embodiments described herein merely illustrate some of the numerous possible networks that may be used, which are within the scope and spirit of the invention.

FIGS. 1a and 1b show a front and back view of a leveling device assembly 100A in accordance with an embodiment. FIGS. 2a and 2b depict a front and back view of a leveling device assembly 100B in accordance with a further embodiment. In accordance with some embodiments, the leveling device assembly 100B of FIGS. 2a and 2b comprises the leveling device assembly 100A of FIGS. 1a and 1 b. The following is a discussion of such an embodiment, however the leveling device assembly 100A of FIGS. 1a and 1b may be a stand-alone embodiment or further embodiments may comprise this leveling device assembly 100A, or the like. In accordance with an embodiment, the leveling device assembly may comprise a leveling device 105 and a leveling device cover (not labeled) which comprises all other components aside from the leveling device 105.

Accordingly, FIGS. 1a and 1b depict a leveling device assembly 100A, which includes a leveling device 105, which is covered by an inflatable bladder 110, which allows a portion of the leveling device 105 to be exposed. For example, in an embodiment, leveling device 105 may be a cellular telephone, personal data assistant, gaming device, or the like, which may comprise or be augmented to comprise leveling capabilities. The following Figures depict an iPhone® or iPod® as a leveling device 105, however further embodiments provide a leveling device 105 that may be various commercially available devices that are used as a leveling device 105.

The inflatable bladder 110 may be any suitable inflatable member that is configured to surround a portion of a leveling device 105. The inflatable member may be configured to be selectively inflated and deflated, which may be achieved via any suitable air port, pump, or the like (not shown). The inflatable bladder 110 may cover and surround some or all of a leveling device 105, which may be configured to provide access to a button, display, power port, data port, or the like, which may be present on a leveling device 105. For example, as depicted in FIG. 1a, the inflatable bladder is configured to allow access to a touch-display of the leveling device 105.

In some embodiments, it may desirable to have an inflatable bladder 110 to protect the leveling device 105 from damage caused by shock or contact, which may include falling or an object hitting the leveling device 105. The inflatable bladder 110 may therefore be configured to provide protection for the leveling device 105 in various embodiments.

Turning to FIG. 1b, the back of the leveling device assembly 100A comprises a rigid plate 115, which comprises a first and second coupling extension 120, a port 125 and a port coupling 130, which is configured to operably engage with at least one port (not shown) on the leveling device 105. For example, the port coupling 130 may be configured to operably engage any of a data port, power port, audio port, or the like, which may be present on a leveling device 105. Accordingly, the inflatable bladder 110 may be configured to provide access to such device ports. In some embodiments, there may be a plurality of ports 125.

The rigid plate 115 may provide a rigid backing support for the coupling extensions 120, the port 125, and the port coupling 130. The rigid plate 115 may or may not be coupled to the inflatable bladder 110. In some embodiments, the rigid plate 115 may be positioned directly adjacent to the leveling device 105 and surrounded by the inflatable bladder 110.

Turning to FIGS. 2a and 2b, a leveling device assembly 100B may be covered with a jacket 210, which surrounds a portion of the leveling device 105 and the inflatable bladder 110. The jacket 210 may comprise a port orifice 225 and coupling extension orifices 220, which provide access to the port 125 and coupling extensions 120 respectively. As shown in FIG. 2a, the jacket 210 may be configured to allow various portions of the leveling device 105 to be exposed, such as a touch-screen display. In various embodiments, the jacket 210 may comprise puncture resistant material such as Kevlar®, or the like.

In further embodiments the leveling device assembly 100A, 100B may include components to protect exposed portions of the leveling device 105. For example, there may be a transparent or translucent cover for the touch-display of the leveling device 105, which may be configured to reside over the touch-display without actually contacting the touch-display.

FIG. 3a is a top view of a leveling device assembly 100C comprising an assembly housing 310A, which includes a plurality of lasers 315, which are positioned about the perimeter of the assembly housing 310A. For example, in various embodiments the leveling device assembly 100A, 100B may be operable to couple with the assembly housing 310A to constitute the leveling device assembly 100C.

In an embodiment, the assembly housing 310A may comprise lasers 315 aligned with an axis of the assembly housing 310A and or leveling device 105. For example, the lasers 315 may be positioned to be aligned with X and Y axes of the assembly housing 310A as shown in FIG. 3a. In further embodiments, there may be one or more laser 315 located in any suitable position on the assembly housing 310A.

In an embodiment, a laser 315 may be powered by a power source located in the assembly housing 310A or may be powered by a power source of the leveling device 105.

In various embodiments, a laser 315 may be operable to emit a beam 320, and may be operable to facilitate calculation of distance, heat, or other such measurements. The assembly housing 310 may include hardware and/or software capable of such functionalities, or such hardware and/or software may be present in whole or in part in the leveling device 105. Additionally, in an embodiment, a laser 315 may be configured to provide an indication by turning on and off or by changing color.

Figure 3B:
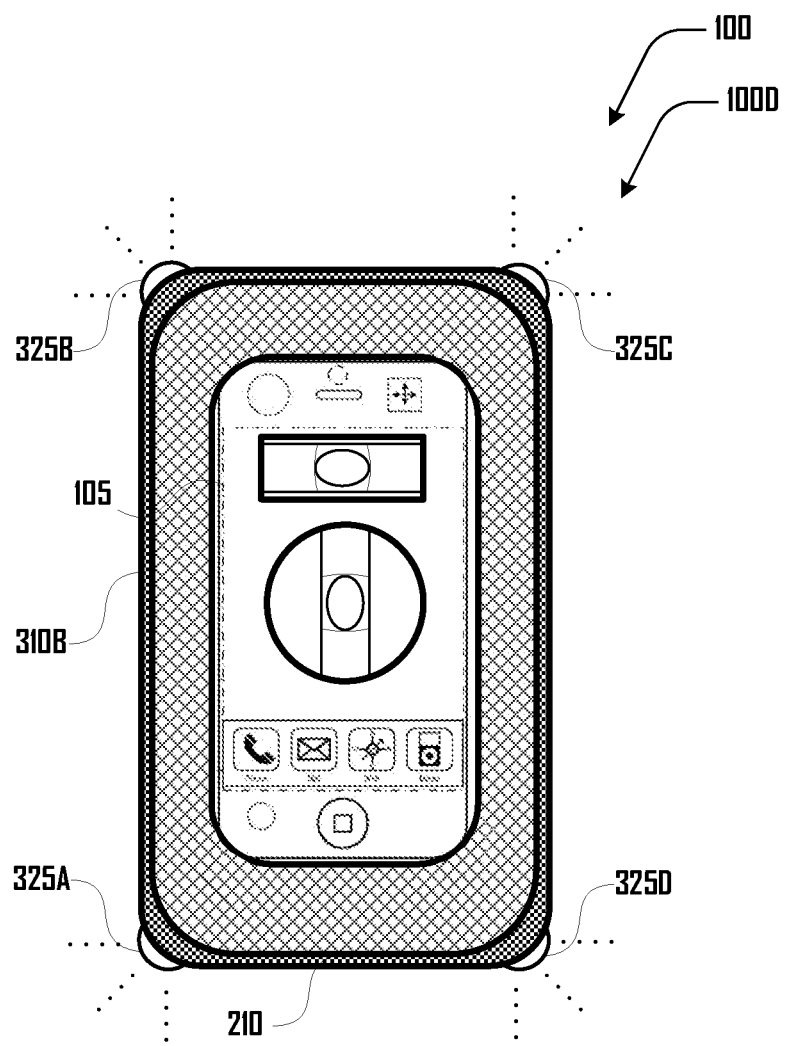
FIG. 3b is a top view of a leveling device assembly comprising indicator lights, in accordance with an embodiment.

FIG. 3b is a top view of a leveling device assembly 100D comprising an assembly housing 310B, which includes a plurality of lights 325, which are positioned about the perimeter of the assembly housing 310B. For example, in various embodiments the leveling device assembly 100A, 100B may be operable to couple with the assembly housing 310B to constitute the leveling device assembly 110D.

In an embodiment, the assembly housing 310B may comprise lights 325 aligned with an axis of the assembly housing 310B and/or leveling device 105, or aligned at the corners of the assembly housing 310B. In further embodiments, there may be one or more light 325 located in any suitable position on the assembly housing 310B.

In an embodiment, a light 325 may be powered by a power source located in the assembly housing 310B or may be powered by a power source of the leveling device 105.

In various embodiments, a light 325 may be operable to emit light 320 and may be configured to provide an indication by turning on and off or by changing color. For example, when leveling, lights on a side that are below level may be a different color than lights that are above level. Alternatively, lights may change intensity as the leveling device 105 changes to a level position.

Figure 4:
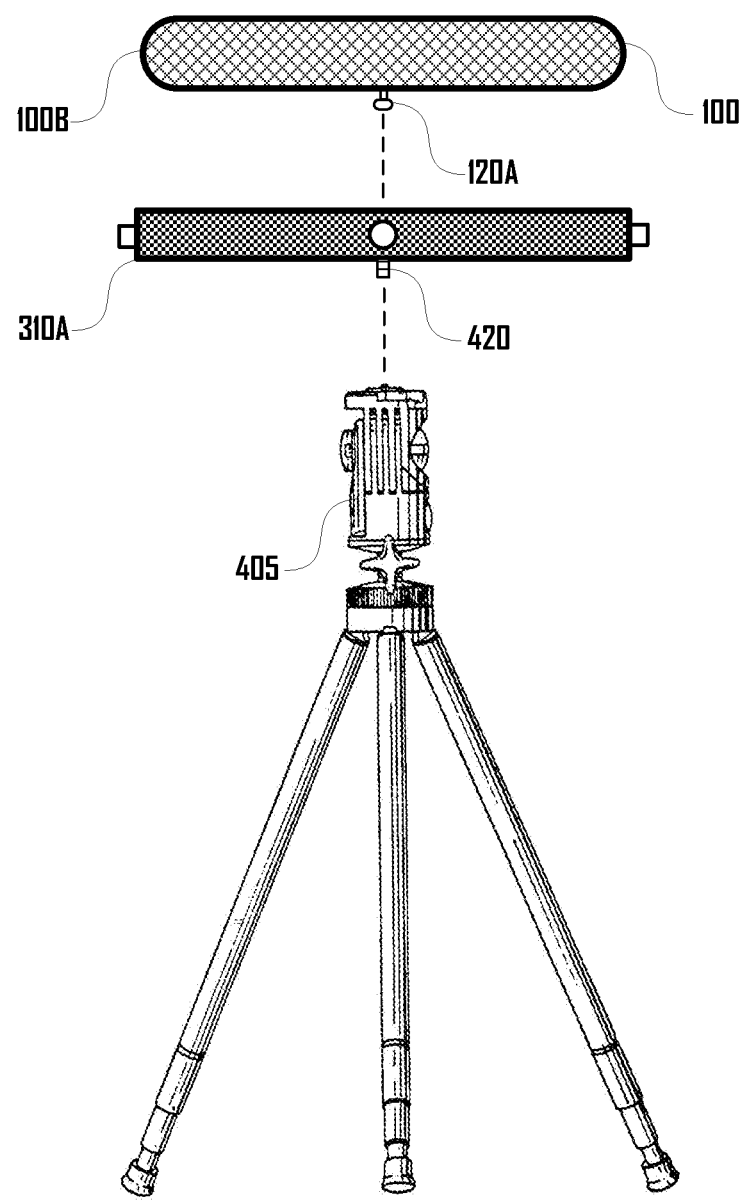
FIG. 4 is a side view of a leveling device assembly comprising a support stand, in accordance with an embodiment.

FIG. 4 is a side view of a leveling device assembly 100B coupling with an assembly housing 310A, which in turn is coupling with a support stand 405. For example, the leveling device assembly 100B of FIGS. 2a and 2b may couple with the assembly housing 310A of FIG. 3a via the coupling extensions 120 of the leveling device assembly 100B, and the assembly housing 310A may then couple with a support stand 405 via a coupling screw 420.

Although a coupling screw 420 and a plurality of coupling extensions 120 in depicted herein, these examples of coupling structures should not be construed to limit the scope of the numerous possible embodiments. For example, coupling between various members may be achieved by any suitable structure or structures.

In an embodiment, a support stand 405 may be a tripod as depicted in FIG. 4; however, in further embodiments, a support stand 405 may be configured in any suitable manner. For example a support stand 405 may include structures that facilitate the stand coupling to other members such as pipes, dimensional lumber, walls and the like. Such coupling structures may include straps, an adhesive, and the like.

Figure 5:
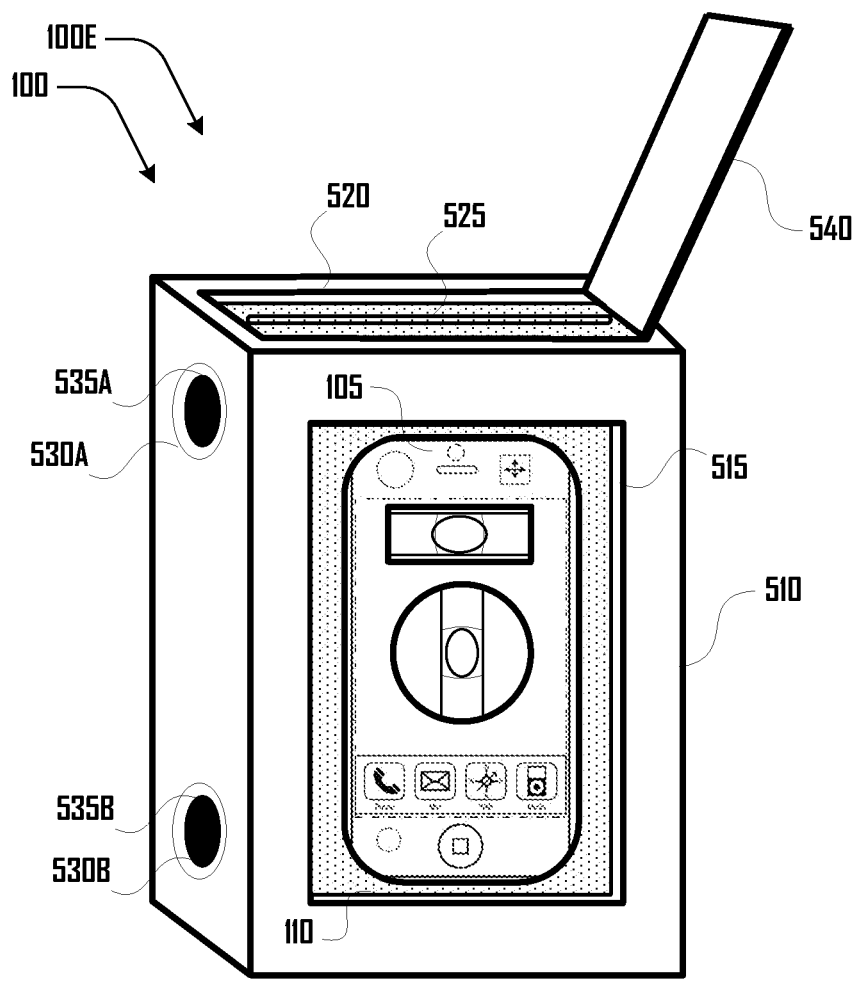
FIG. 5 is a perspective front view of a leveling device housing in accordance with an embodiment.
Figure 6:
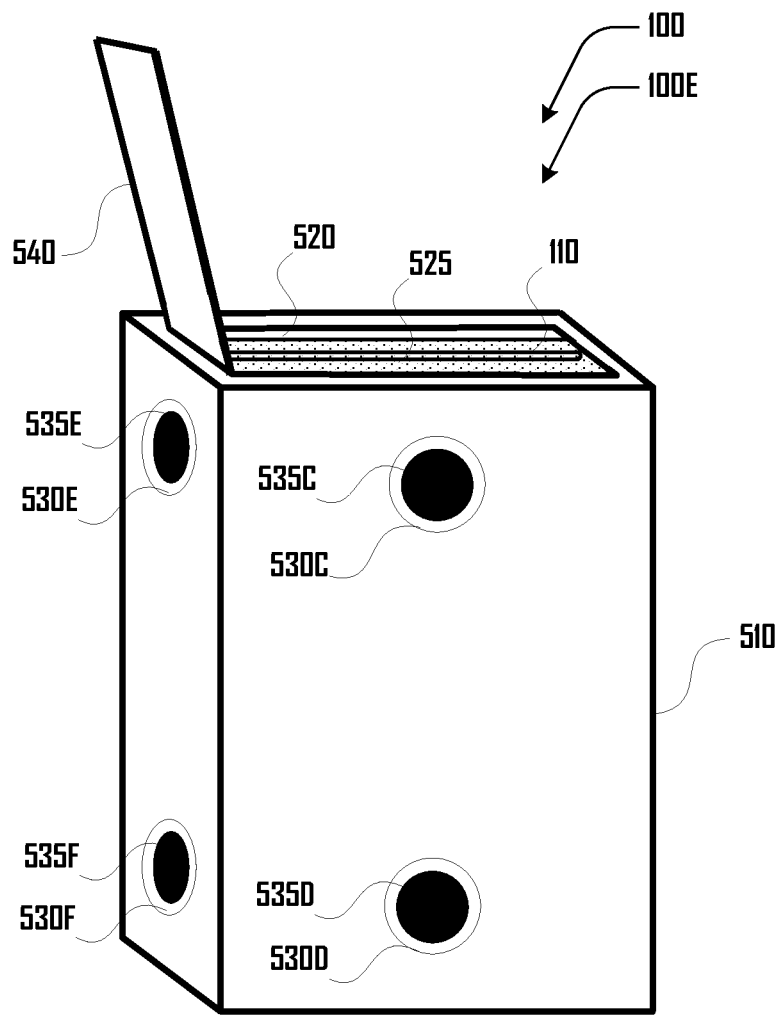
FIG. 6 is a perspective rear view of a leveling device housing in accordance with an embodiment.

FIGS. 5 and 6 show a perspective front and rear view of a leveling device assembly 110E in accordance with an embodiment, which comprises an assembly housing 510, which houses an inflatable bladder 110 and a leveling device 105. For example, in some embodiments the device assembly 100A of FIGS. 1a and 1b or a similar device assembly 100 may be housed within the assembly housing 510, which may or may not include the rigid plate 115. Alternatively, the inflatable bladder 110 may be configured for the assembly housing 510.

As depicted in FIGS. 5 and 6, the assembly housing 510 comprises a display orifice 515 on a side of the assembly housing 510, and an introduction orifice 520, which is selectively covered by a hatch 540. The display orifice 515 may be configured to allow a display portion of the leveling device 105 to be exposed. The introduction orifice 525 may be configured to allow the leveling device 105 to be introduced into the assembly housing 510 and into a cavity within inflatable bladder 110 via the bladder slit 525.

The assembly housing 510 further comprises a plurality of magnets 535, which reside within a magnet cavity 530. As depicted in FIGS. 5 and 6, magnets 535 within corresponding magnet cavities 530 may be present on various surfaces of the assembly housing 510.

In some embodiments, various components of the leveling device assembly 100E and/or leveling device 105 may be sensitive to a magnetic field generated by the plurality of magnets 535 present about the assembly housing 510. Accordingly, there may be magnetic shielding present in suitable locations to prevent a magnetic field from interfering with the operation of various components of the leveling device assembly 100E and/or leveling device 105.

In an embodiment, the inflatable bladder 110 may be selectively inflated and deflated. For example, the inflatable bladder 110 may be deflated and a leveling device 105 may be introduced into a cavity within the inflatable bladder 110 via the bladder slit 525. The inflatable bladder 110 may then be inflated so as to securely hold the leveling device 105. In some embodiments, the inflatable bladder 110 may be inflated and/or deflated via a mechanism associated with the hatch 540.

The plurality of magnets 535 may allow the leveling device assembly 100E to couple with metals and magnetic surfaces along the various surface of the leveling device assembly 100E.

Figure 7:
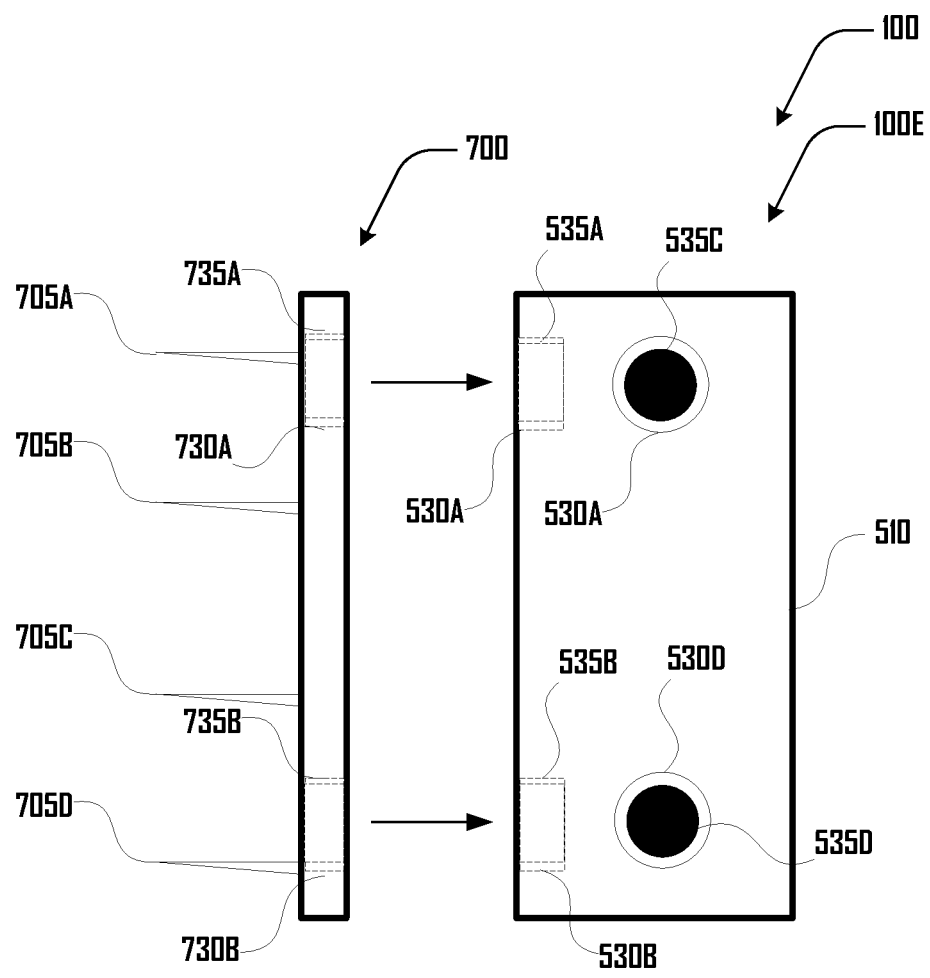
FIG. 7 is a side view of a leveling device housing and a coupling attachment in accordance with an embodiment.

Additionally, as depicted in FIG. 7, the leveling device assembly 100E may also couple with a coupling attachment 700. The coupling attachment 700 may comprise a coupling body 735 residing within a cavity 730. The coupling body may be a magnet or a material that would couple with a magnet. Additionally, the coupling bodies 735 are positioned to correspond to magnets 535 of the leveling device assembly 100E. In the exemplary coupling attachment 700 of FIG. 7, there are a plurality of nails 705 which can be used for attachment of the coupling attachment 700 to various substrates (e.g. wood, dirt, and the like). In further embodiments, a coupling attachment 700 may comprise any desirable coupling mechanism, which may include straps, an adhesive, a hook, and the like.

Additionally, although a specific configuration of magnets 535 and cavities 530 is depicted in these figures, it should be appreciated that any suitable configuration may be employed, and that the configuration of coupling bodies 735 may be similarly configured.

In an embodiment, the assembly housing 510 may further include structures such as lasers, lights and the like, which may operate as similar structures do in FIGS. 3a and 3b. Additionally, various elements as shown and described in relation to FIGS. 1a, 1b, 2b, 2c, 3a, 3b, 5, 6 and 7 may be combined, removed or otherwise selected for a leveling device assembly 100. Accordingly, FIGS. 1a, 1b, 2b, 2c, 3a, 3b, 5, 6 and 7 should be construed to merely depict various exemplary structures or components that may or may not be present in an embodiment.

As described herein, a leveling device 105 may comprise various leveling, positioning, and acceleration functionalities. For example a leveling device 105 may comprise elements such as a compass, a leveling body, a global positioning system (GPS), an accelerometer, an electronic timing device, a compass device, an azimuth-finding device, a vector detecting device, image capturing device, audio recording device, and the like. However, in some embodiments, a leveling device 105 may lack one or more of these functionalities and related functional elements, and may merely be a processor or computer.

Accordingly, in some embodiments, various portions of a leveling device assembly 100 may comprise such functional elements as described above, and suitable hardware and/or software to be operatively coupled with the leveling device 105. In some embodiments, such operable coupling may be via a port 125 and a port coupling 130, or the like.

For example in an embodiment, the leveling device 105 may be a cellular telephone that does not have elements such as a compass, a leveling body, a global positioning system (GPS), an accelerometer, and the like. However, such a leveling device 105 may be operably coupled with a leveling device assembly 100, which includes one or more of these elements, and the leveling device 105 may serve the purpose of a power source, controller, computer, processor or the like, for such elements present in the leveling device assembly 100. In some embodiments such functional elements may augment existing functional elements present in a leveling device 105.

In various embodiments, an assembly housing 510 may comprise a touch screen or display or buttons. Such a display or touch screen or buttons may augment, or replace various functionalities of a leveling device 105. For example, it may be desirable to protect the display of a leveling device 105, and a portion of the leveling device display may be covered or protected. Accordingly, a display or touch screen or buttons on an assembly housing 510 may be used to control various aspects of the leveling device 105. In some embodiments, a display or touch screen or buttons on an assembly housing 510 may facilitate less functionality than the leveling device 105 is actually capable of when not within the assembly housing 510.

In an embodiment, an assembly housing 510 may comprise a battery, which may or may not be used to power a coupled leveling device 105 or various elements of the assembly housing 510.

In an embodiment, coupling of a leveling device 105 with an assembly housing 510 may configure the leveling device 105 to function differently than when not coupled with the assembly housing 510. For example, coupling with an assembly housing 510 may cause the leveling device 105 to surrender to a mode whereby the leveling device 105 is controlled only by voice command. In another example, coupling with an assembly housing 510 may turn off a display, touch screen or other controls on the leveling device 105.

Figure 8A:
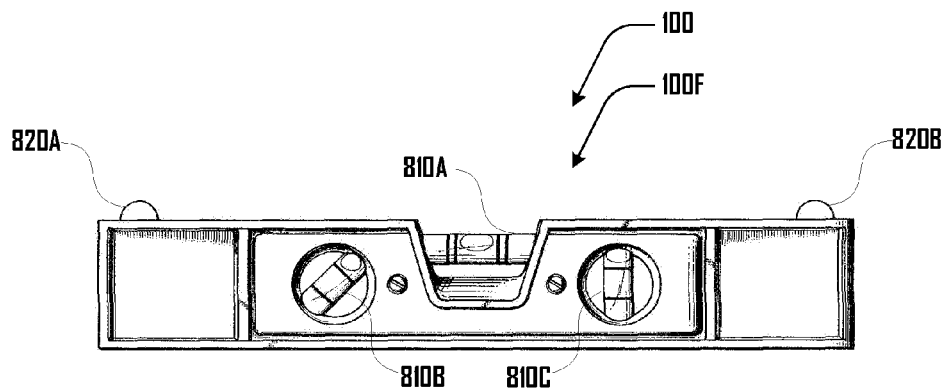
FIG. 8a is a side view of a level in accordance with various embodiments.
Figure 8B:
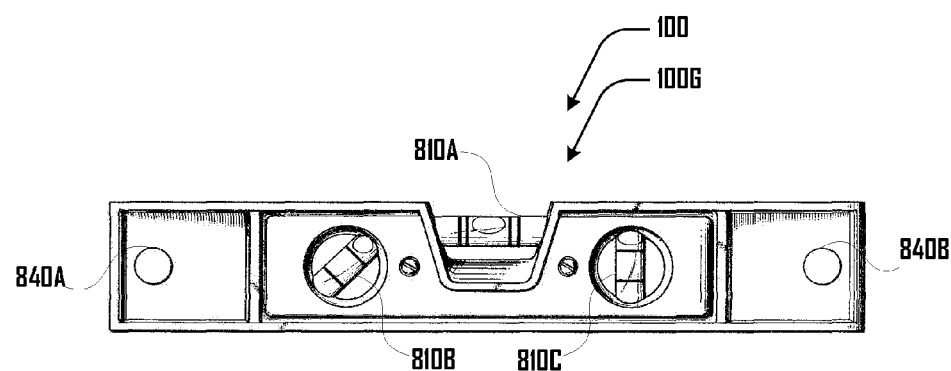
FIG. 8b is a side view of another level in accordance with various embodiments.
Figure 8C:
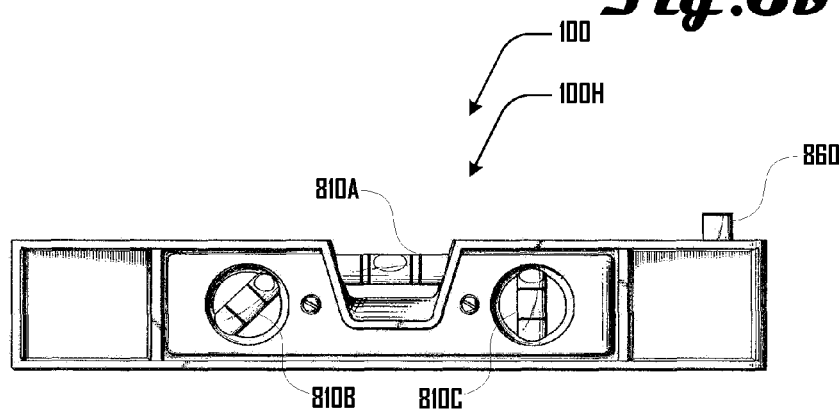
FIG. 8c is a side view of a further level in accordance with various embodiments.

FIGS. 8a, 8b and 8c depict a side view of a leveling device assembly 100F, 110G, 110H in accordance with various embodiments. The leveling device assembly 100 comprises a plurality of leveling bodies 810, and in some embodiments, the leveling device assembly 100 may comprise one or more leveling light 820A, 820B, one or more speaker 840A, 840B, and an antenna 860.

While FIGS. 8a, 8b and 8c depict an approximately rectangular leveling device assembly 100, a leveling device assembly 100 in accordance with various embodiments may be various shapes and sizes. Additionally, in some embodiments, a leveling body 810 may comprise a liquid filled tube with a gas bubble as shown in FIGS. 8a, 8b and 8c; however, a leveling body 810 may be various types of devices that facilitate leveling.

In various embodiments, a leveling device assembly 100 may provide an indication of whether it is level, or if one or more leveling body 810 of the leveling device assembly 100 is level. For example, as shown in FIG. 8a, there may be one or more leveling light 820 that indicates whether the leveling device assembly 100F is level, a direction that the leveling device assembly 100F would need to move or rotate to achieve a level position, and the like. In one example, a leveling light 820 may blink on a side that needs to be moved down to achieve a level position. In another example, both leveling lights 820A, 820B may be lit when the leveling device assembly 100F is level.

In further embodiments, there may be various numbers of leveling lights 820 in various positions about a leveling device assembly 100, and leveling lights 820 may be various sizes and shapes. For example, a leveling light 820 may be shaped as an arrow. In still further embodiments, a leveling light 820 may comprise a laser, and the like.

Additionally, in some embodiments, level status may be presented via one or more speaker 840. For example, a speaker 840 may present level status so as to instruct a user on how to achieve a level position. For example, in some embodiments, a speaker 840 may present instructions such as: "right side down"; "left side up"; "level achieved"; and the like. In another example, various types of non-lingual audio indications may indicate to a user how to position the leveling device assembly 100G such that a level position is achieved.

In further embodiments, visual indicators (such as a leveling light 820, and the like) or audio indications (via a speaker 840, and the like) may present position status. For example, a user may indicate or input a desired position of a leveling device assembly 100, and the leveling device assembly 100 may provide indications of how to move the leveling device assembly 100 to achieve the desired position. Desired position may include characteristics such as Global Positioning System ("GPS") coordinates, a compass direction, a height, a distance from a selected point, and the like.

Accordingly, in such embodiments, an audio indication may be presented via a speaker 840, which may include indications such as: "rotate clockwise"; "move two feet to the right"; "move two feet east"; "move down one foot"; right side up", and the like. In some embodiments, such indications may be non-lingual or visual.

Figure 22A:
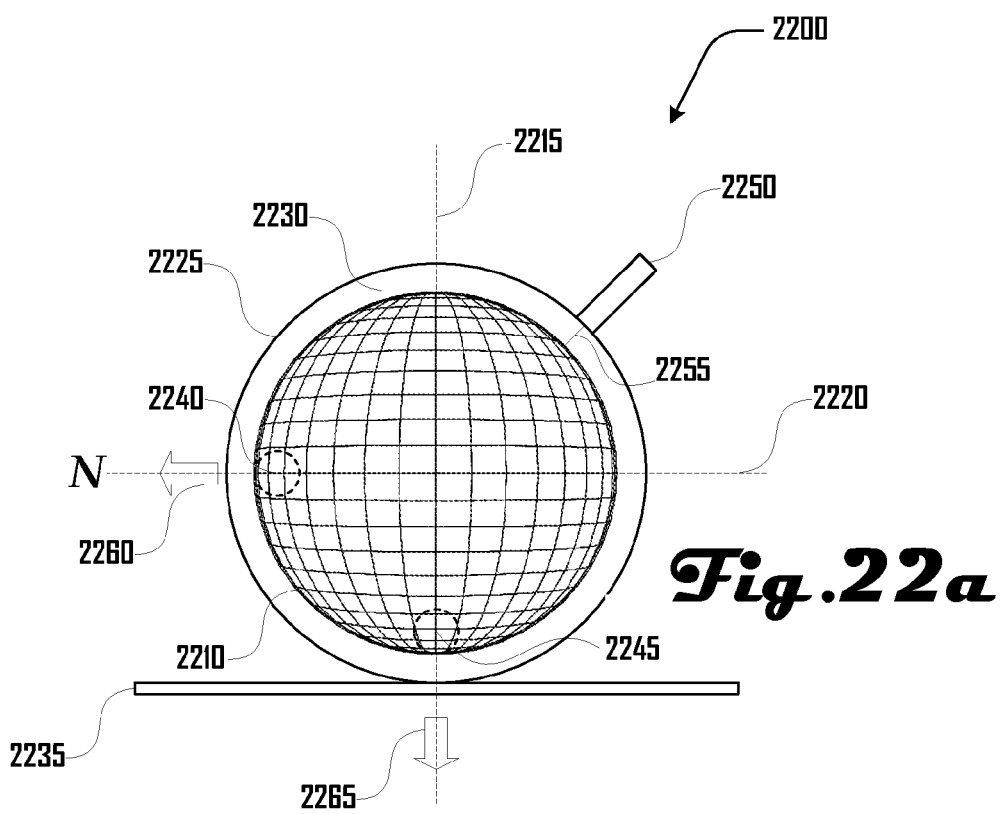
FIGS. 22a and 22b show a side view of a positioning sphere in accordance with various embodiments.

Additionally, FIGS. 8a, 8b, and 8c depict a liquid and bubble leveling body 810, and in some embodiments, various indications of level status or position status may be based on data from one or more of said liquid and bubble leveling bodies 810. However, in various embodiments, another type of leveling body 810 may provide data regarding level status, and a leveling body 810 may not be visible to a user. In various embodiments, leveling status data and/or positioning data may be obtained from a positioning unit 1245, and in some embodiments, positioning status data may include leveling status data. In some embodiments, the leveling body 810 may be a positioning sphere 2200 as depicted in FIGS. 22a and 2b.

Figure 23A:
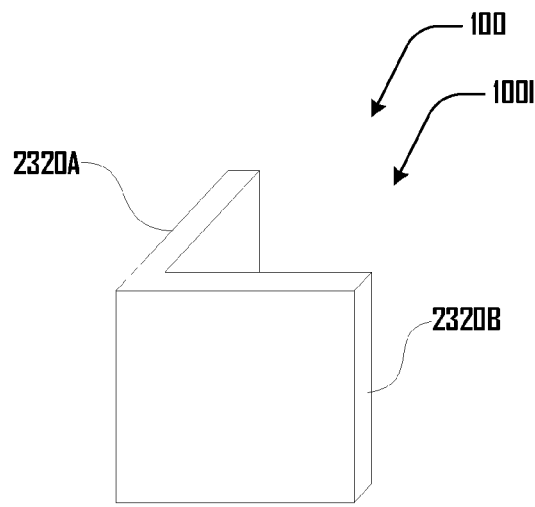
FIGS. 23a and 23b show a perspective view of a level in accordance with various embodiments and FIG. 23c illustrates a leveling device assembly having at least one cavity defined by a housing and a leveling device disposed within the housing.
Figure 23B:
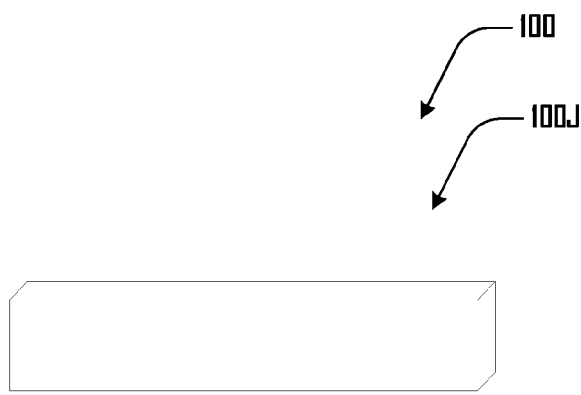
Figure 23C:
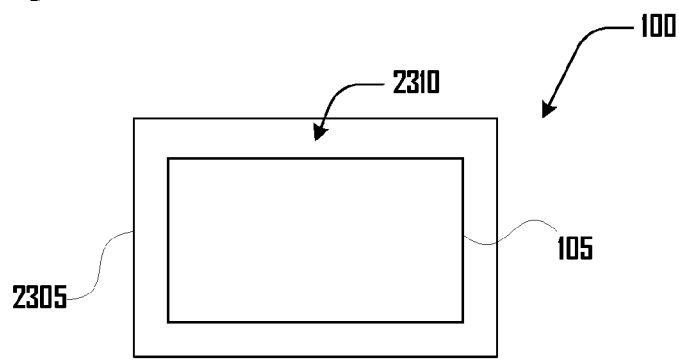

Additionally, the leveling device assembly 100 may be various shapes and sizes. For example, FIGS. 23a and 23b depict a leveling device assembly 100 in accordance with various embodiments. For example, FIG. 23a depicts a leveling device assembly 100I comprising a pair of rectangular bodies 2320, which meet at an edge. As shown in FIG. 23a, the rectangular bodies 2320 may be coupled at a right angle, but may be joined at other angles in further embodiments. Additionally, FIG. 23b depicts a leveling device assembly 100J shaped as an elongated rectangular body. FIG. 23c illustrates a leveling device assembly 100 comprising a housing 2305 that defines a device cavity 2310 and a leveling device 105 disposed within the device cavity 2310.

FIG. 8c depicts a leveling device assembly 100H comprising an antenna 860, and said antenna 860, in various embodiments, may communicate with various devices such as an admin device 1110, an audio device 1020, a user device 1130, and the like, which may be achieved via a network 1040, and the like. For example, the antenna 860 may communicate to various devices position status data, leveling data, indications relating to how to achieve a desired leveling position or position, and the like. Such exemplary communications are further described herein.

In further embodiments, the leveling device assembly 100 may comprise a display 440 and an input device such as a keyboard or keypad, which may enable a user to define a leveling goal, define a positioning goal, define danger zone parameters, calibrate one or more component of the leveling device assembly 100, view and edit leveling data, view and edit positioning data, and the like.

Figure 9:
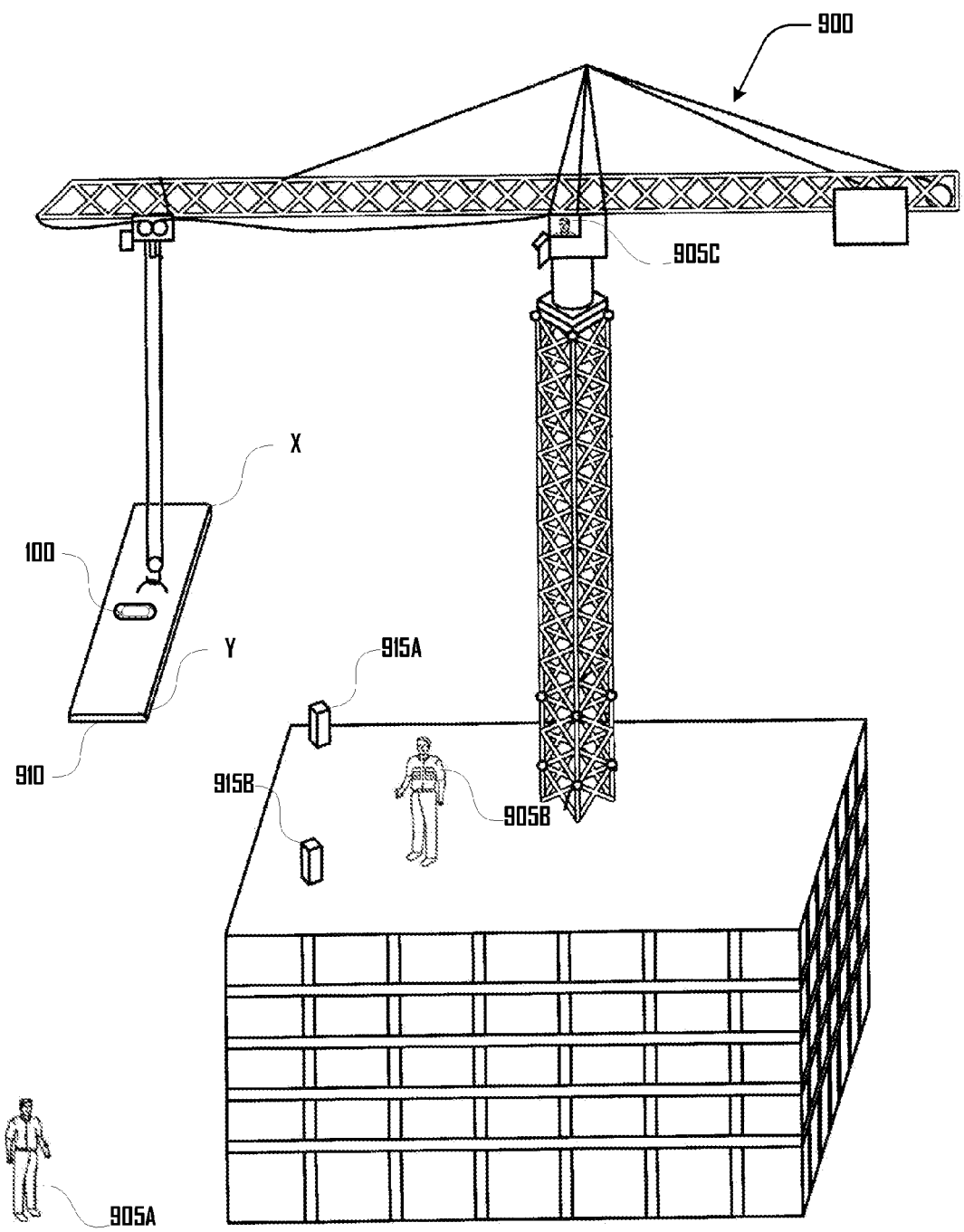
FIG. 9 is an environmental view of a leveling device being used in conjunction with a crane and a plurality of operators.

FIG. 9 is an environmental view of a leveling device assembly 100 being used in conjunction with a crane 900 and a plurality of operators 905. The operators 905 are depicted positioning a beam 910 onto a pair of posts 915, where a leveling device assembly 100 is positioned on the beam 910. In such an example, and as further described herein, the leveling device assembly 100 may perform various functions to assist in work-tasks and to promote safety of the operators 905, crane 900 and building materials.

For example, in an embodiment, the leveling device assembly 100 may be operable to provide leveling and/or positioning indications to the operations visually and/or audibly. As described herein, the leveling device assembly 100 may include lights, lasers, or speakers, which provide visual or audio indications of positioning and/or level status.

In another example, the operators 905 may each have an audio device 1020 such as a headset (FIGS. 10-18), which are operably connected to the leveling device assembly 100 and allow the operators to receive audio indications of leveling and/or positioning status. Additionally, the leveling device assembly 100 may be operable to provide warning to the operators when safety hazards are present. Such safety hazards may include a beam 910 wildly swinging out of level or otherwise out of desired position, a hazard may include the position of moving items being dangerously close to an operator 905, and the like.

In a further embodiment, operators 905 may be able to receive personalized indications of leveling and/or positioning status. For example, presuming that the beam 910 has a first and second end X and Y, the identity of each end X and Y will be different in terms of left and right based on the perspective of the operator. The crane operator 905C and the operator 905B near the crane 900 will perceive the X end as right, and the Y end as left. However, the ground operator 905A will perceive the Y end as right, and the X end as left. Accordingly, the leveling device assembly 100 may be operable to provide leveling or positioning indications which can be customized to the perspective and position of various operators 905.

Figure 10:
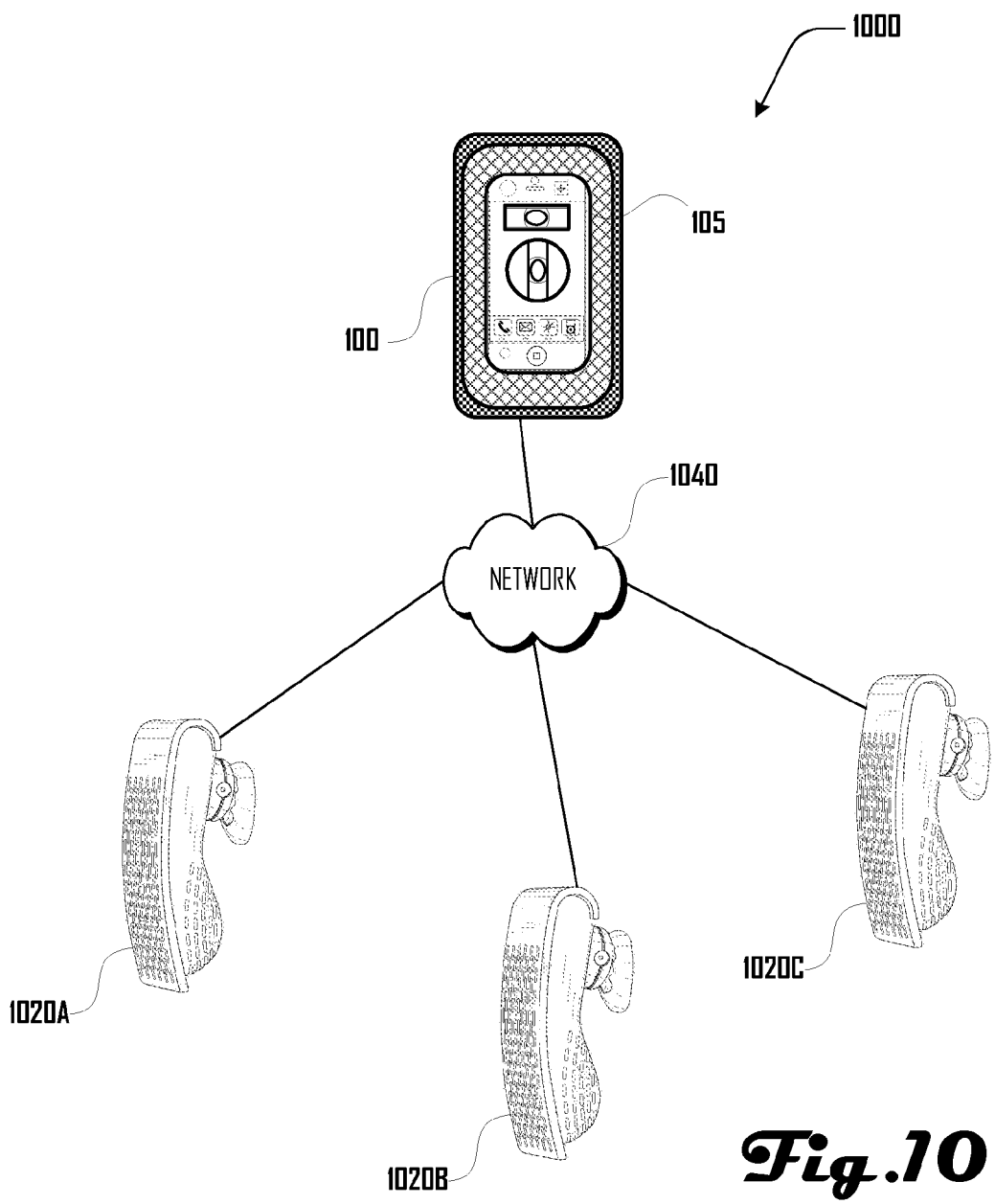
FIG. 10 is a pictorial diagram of a system of interconnected devices, in accordance with various embodiments, which includes a plurality of audio devices operably connected to a leveling device.

FIG. 10 is a pictorial diagram of a system 1000 of interconnected devices, in accordance with various embodiments. The system 1000 comprises a leveling device assembly 100 and a plurality of audio devices 1020A, 1020B, and 1020C, which are operably connected via a network 1040. In various embodiments, the network 1040 may be a wireless network, and the leveling device assembly 100 may be connected to the network 1040 via an antenna 860 (FIG. 8*c*) or via a wireless network interface, which may be present in a portion of the leveling device assembly 100 and/or the leveling device 105.

As described herein, the leveling device assembly 100 may communicate position status data, leveling data, indications relating to how to achieve a desired leveling position or position, and the like. Such communications may be obtained by an audio device 1020, which may present such data or indications in various forms. In some embodiments, an indication relating to how to achieve a desired leveling state or position may be presented in relation to the location of the audio device 1020.

For example, if an audio device 1020 is on a front side of a leveling device assembly 100, (i.e. a user is in front of the leveling device assembly 100) an indication of "move right side down" may be relevant to an observer in obtaining a level position for the leveling device assembly 100. However, if the audio device 1020 is behind the leveling device assembly 100 in the same situation, then an indication of "move left side down" may be relevant to an observer in obtaining a level position for the leveling device assembly 100.

In such examples, there may be a plurality of audio devices 1020 and indications may be modified for each audio device 1020 based on the location of a given audio device 1020. In some embodiments, the leveling device assembly 100 or audio device 1020 may modify such indications based on obtained audio device location data and level location data.

Audio devices 1020 may be various devices in accordance with some embodiments. For example, a Bluetooth headset, a radio, a cellular telephone, a personal data assistant, and the like may function as an audio device 1020. In various embodiments, an audio device 1020 may be any device capable of producing an audio presentation.

Figure 11:
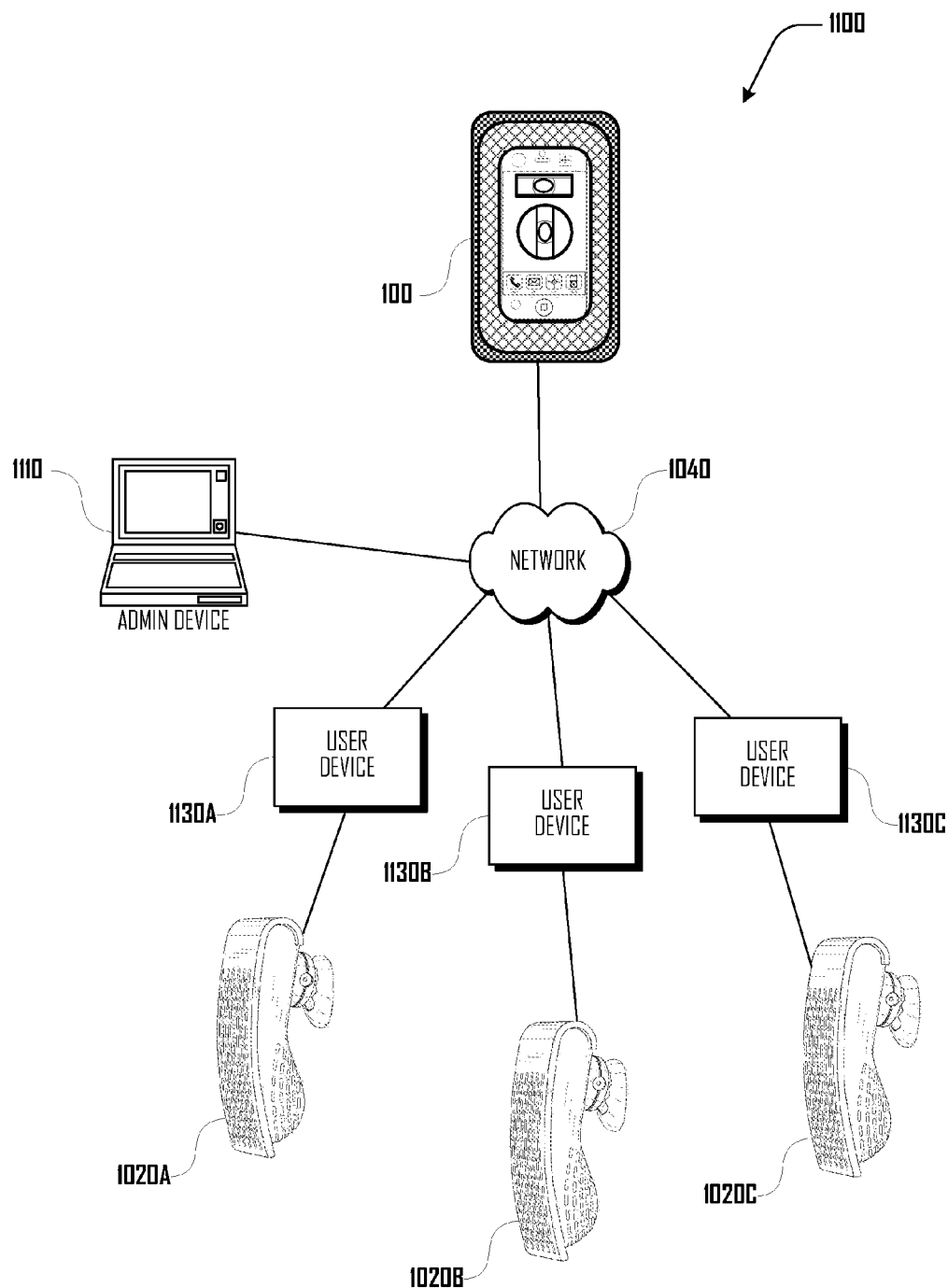
FIG. 11 is a pictorial diagram of another system of interconnected devices, in accordance with various embodiments which includes a plurality of audio devices operably connected to a respective user device that is operably connected to an admin device and a leveling device.

FIG. 11 is a pictorial diagram of another system 1100 of interconnected devices, in accordance with various embodiments, which comprises a plurality of user devices 1130, an admin device 1110 and a leveling device assembly 100, which are all operably connected via a network 1040. Additionally, each user device 1130 is operably connected to an audio device 1020.

As discussed in relation to FIG. 10, various devices may be operably connected via a wireless network 1040, and may be connected in various other ways. In some embodiments, a user device 1130 and audio device 1020 may be embodied together in a helmet, an earpiece, a cellular telephone, a personal data assistant, and the like. Additionally, as discussed above, a determination may be made regarding location of any of an admin device 1110, user device 1130, and audio device 1020, and indications relating to how to achieve a desired leveling status or position, and the like, may be modified or customized based on such a determined location of various devices.

In further embodiments, a determination of a danger zone may be made in relation to objects associated with a leveling device assembly 100, which may include objects being leveled or positioned by the leveling device assembly 100. For example, a danger zone may be defined as an area where an object would fall if it were to be released from a coupling, lose balance, fall down a slope, explode, and the like.

In such embodiments, a danger zone may be determined for an object associated with a leveling device assembly 100, and a further determination may be made whether a given device is located within the defined danger zone. Where a user device 1130 is located in a defined danger zone, an alert may be presented via an audio device 1020, a leveling light 325 or laser 315 (FIG. 3), a speaker, and the like. In some embodiments, such an alert can be provided to a plurality of user devices 1130, wherein some are within the danger zone or such an alert may only be provided to user devices 1130 within the danger zone.

In various embodiments, the admin device 1110 may record a leveling or positioning session, which may include data regarding level position, leveling status, danger zone, position of one or more user device 1130, position of one or more audio device 1020, position of an admin device 1110, and the like. In other embodiments, such data may be recorded by any of a leveling device assembly 100, an admin device 1110, a user device 1130, an audio device 1020, and the like. In further embodiments, and admin device 1110 may obtain an alert, position data, level-status data, define a leveling goal, define a positioning goal, define danger zone parameters, and the like.

In various embodiments, wherein indications relating to achieving a desired leveling status or position are obtained wirelessly, via an audio presentation, or via a visual presentation, such embodiments may be desirable because a leveling device assembly 100 may not be immediately visible to one or more users because of where the leveling device assembly 100 is position on an objected being leveled or positioned.

For example, a user of a leveling device assembly 100, having only a liquid and bubble leveling body 110, may not be able to view such a relatively small indicator when leveling a post with a tractor or backhoe. In such an example, it may be desirable to obtain indications of position and level status which can be perceived from a distance or that can be perceived in noisy environments. Here, it may be desirable for the user to be able to view or hear such indications while driving the tractor or backhoe.

In various embodiments, there may be a plurality of level device assemblies 100 connected via a network 1040, which may each communicate data regarding position status or level status to each other, to a master leveling device assembly 100, to an admin device 1110, to a user device 1130, an audio device 1020, and the like. In such embodiments, there may be more than one leveling and/or positioning goal, and indications may be given to facilitate each leveling device assembly 100 in reaching its leveling and/or positioning goal.

Figure 12:
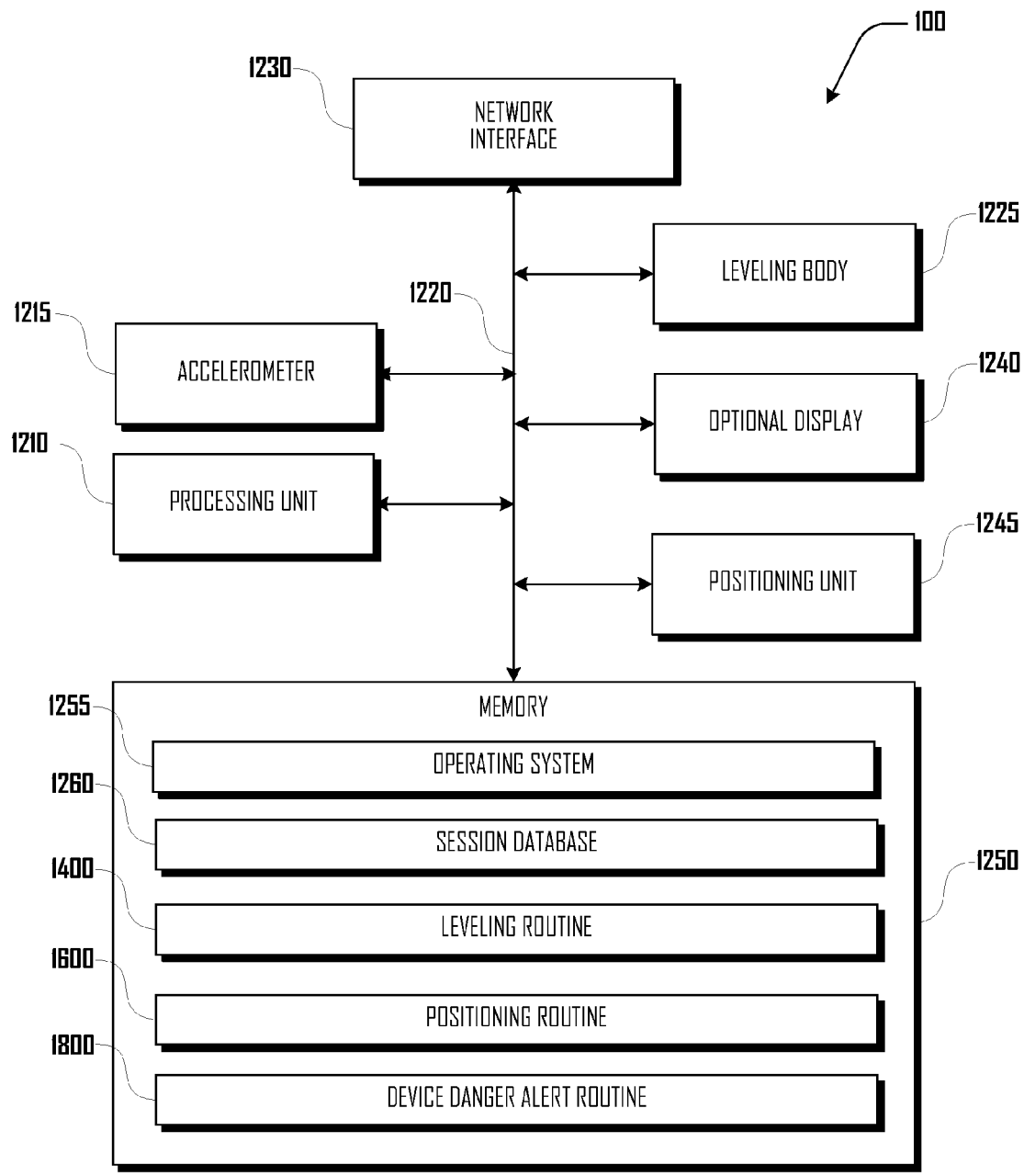
FIG. 12 is a block diagram of a device that provides an exemplary operating environment for various embodiments.

FIG. 12 illustrates several components of an exemplary operating environment 1200 for an embodiment. For example, a leveling device assembly 100 can be embodied in the operating environment 1200 depicted in FIG. 12. Such components may be embodied in whole or in part in a leveling device 105 or may be embodied in whole or in part in other portions of a leveling device assembly. Those of ordinary skill in the art and others will appreciate that the operating environment 1200 may include many more components than those shown in FIG. 12. However, it is not necessary that all of these generally conventional components be shown in order to disclose an enabling embodiment for practicing the embodiments described herein.

As shown in FIG. 12, the operating environment 1200 includes a network interface 1230 for connecting to remote devices (not shown). The network interface 1230 may be a network interface designed to support a local area network ("LAN"), wireless local area network ("WLAN"), personal area network ("PAN"), Worldwide Interoperability for Microwave Access ("WiMax"), telephone network, pager network, powerline connection, serial bus, universal serial bus ("USB") wireless connection, antenna 860, or the like. The network interface 1230 includes the necessary circuitry, driver and/or transceiver for such a connection and is constructed for use with the appropriate protocols for such a connection.

The operating environment 1200 also includes a processing unit 1210, an optional display 1240, an accelerometer 1215, a leveling body 1225, a positioning body 1245, and a memory 1250, all interconnected along with the network interface 1230 via a bus 1220. Those of ordinary skill in the art and others will appreciate that the optional display 1240 may not be necessary in all forms of computing devices and, accordingly, is an optional component.

The memory 1250 may generally comprise random access memory ("RAM"), a read only memory ("ROM") and a permanent mass storage device, such as a disk drive, flash RAM, or the like. The memory 1250 stores the program code necessary for a leveling routine 1400, a positioning routine 1600 and a device danger alert routine 1800. Additionally, the memory 1250 stores an operating system 1255 and a session database 1260. In some embodiments, the memory 1250 or elements stored therein may reside on an admin device 1110, user device 1130, audio device 1020 or leveling device assembly 100.

It will be appreciated that the software components may be loaded from a computer readable medium into memory 1250 of the operating environment 1200 using a drive mechanism (not shown) or network mechanism (not shown) associated with the computer readable medium, such as a floppy, tape, digital video disc (DVD)/CD-ROM drive, flash RAM, network interface card, or the like.

Although an exemplary operating environment 1200 has been described that generally conforms to a conventional general-purpose computing device, those of ordinary skill in the art will appreciate that a operating environment 1200 may be any of a great number of devices capable of functioning as a device, server or operating environment that is within the spirit or scope of the embodiments described herein or can perform at least one function of the embodiments described herein.

In one exemplary embodiment, an admin device 1110, a user device 1130 or an audio device 1020 can configure or interact with the operating environment 1200 using a graphical user interface. An example of a graphical user interface is an interactive web page, e.g., in HTML (HyperText Markup Language), Flash, JavaScript, VBScript, JScript, ASP.NET, PHP (HTML Preprocessor) or XHTML (eXtensible HyperText Markup Language) form, or the like. Resultantly, since users are generally familiar with the user interfaces of web pages, including sophisticated web pages such as Flash-enabled web pages from Macromedia, Incorporated of San Francisco, Calif., consumption of peer to peer device services using a web page based graphical user interface on a peer to operating environment 1200 (e.g., displayed on the peer to peer display 1240) may be made familiar and user friendly.

In various embodiments, a leveling body 110 may comprise various devices operable to determine or calculate the level status of an object, which may include a spirit or bubble level (i.e. a liquid and bubble leveling apparatus) an inclinometer, tilt sensor, and the like. In further embodiments, the positioning unit 1245 may comprise a leveling body 110, a GPS device, a compass, SkyHook Wireless enabled device, cellular triangulating device, and the like.

Figure 13:
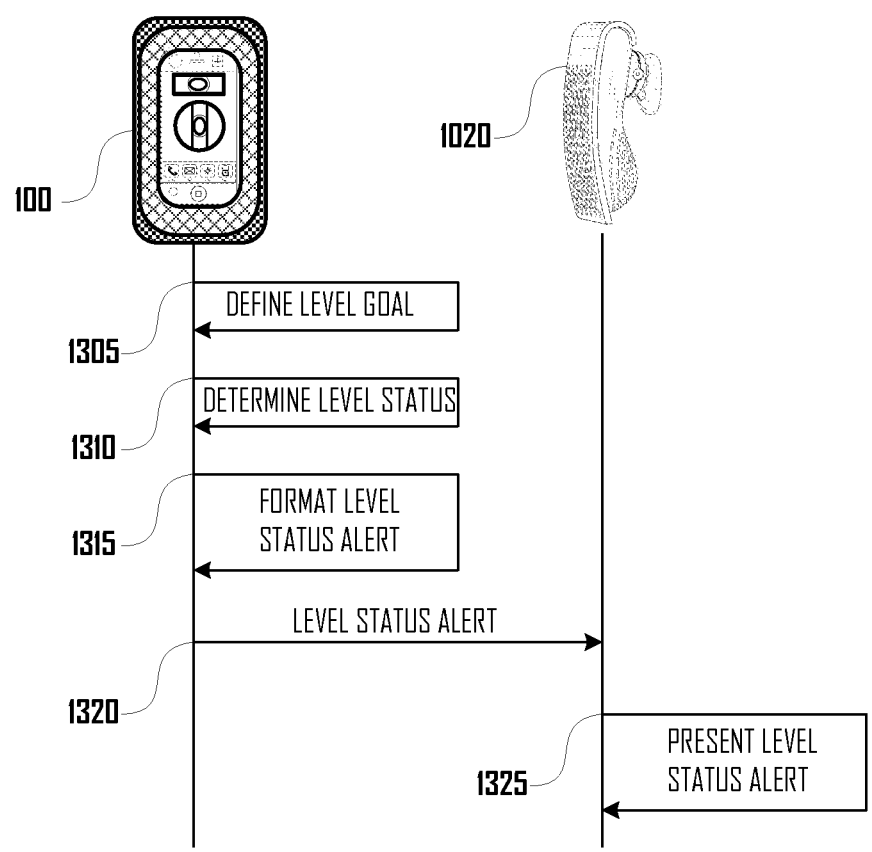
FIG. 13 is a diagram illustrating the actions taken by a leveling device and an audio device in accordance with various embodiments.

FIG. 13 is a diagram illustrating the actions taken by a leveling device 100 and an audio device 1020 in accordance with various embodiments. The actions begin where a level goal is defined 1305. In some embodiments, a default leveling goal may be true level, whereas other leveling goals in relation to true level may be defined 1305.

Level status is determined 1310, and a level status alert is formatted 1315 and the level status alert is sent 1320 to the audio device 1020, where the level status alert is presented 1325. For example, a presented 1325 status alert may be "rotate clockwise ten degrees"; "move right side down"; "level goal achieved"; and the like. In further embodiments, level status alert may be formatted 1315 based on a determined location of an audio device 1020 or other device.

Figure 14:
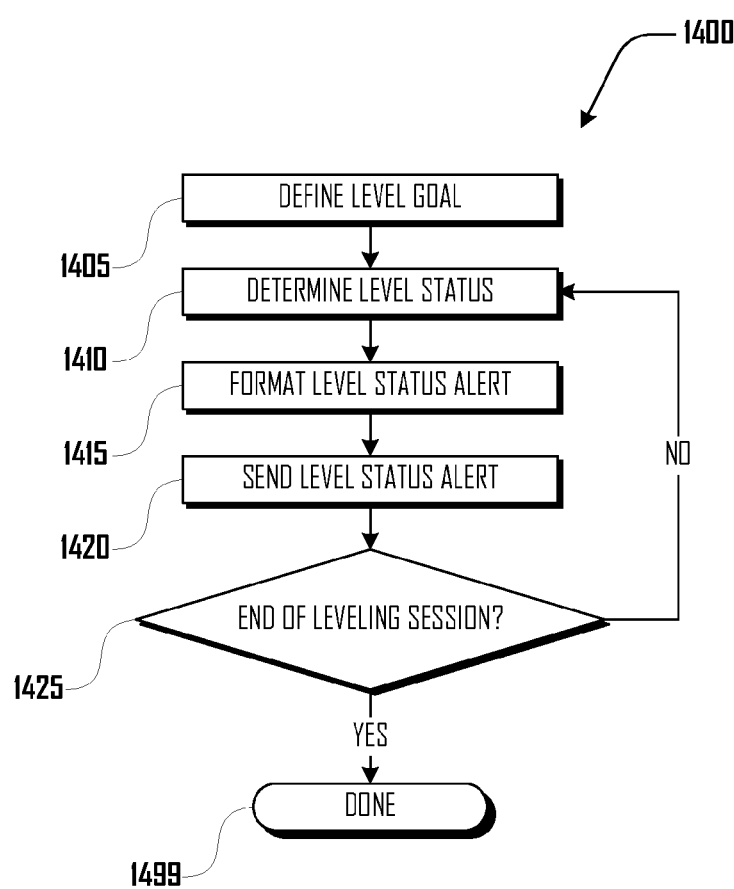
FIG. 14 is a flow diagram illustrating a leveling routine in accordance with various embodiments.

FIG. 14 is a flow diagram illustrating a leveling routine 1400 in accordance with various embodiments. The leveling routine 1400 begins in block 1405 where a level goal is defined, which may be defined via an input on the leveling device assembly 100, or remotely via a user device 1130 or admin device 1110. In further embodiments, a default level goal may be automatically defined as true level.

In block 1410, a level status is determined, which may include degrees or percentage off from level, and the like. In block 1415 a level status alert is formatted and in block 1420 a level status alert is sent 1420. A level status alert may be sent to another device, to a leveling light 120, a speaker 140, and the like.

In decision block 1425 a determination is made whether the leveling session has ended, and if the leveling session has ended the leveling routine 1400 ends in block 1499. However, if the leveling session is not ended, then the leveling routine 1400 cycles back to block 1410, where level status is again determined.

Figure 15:
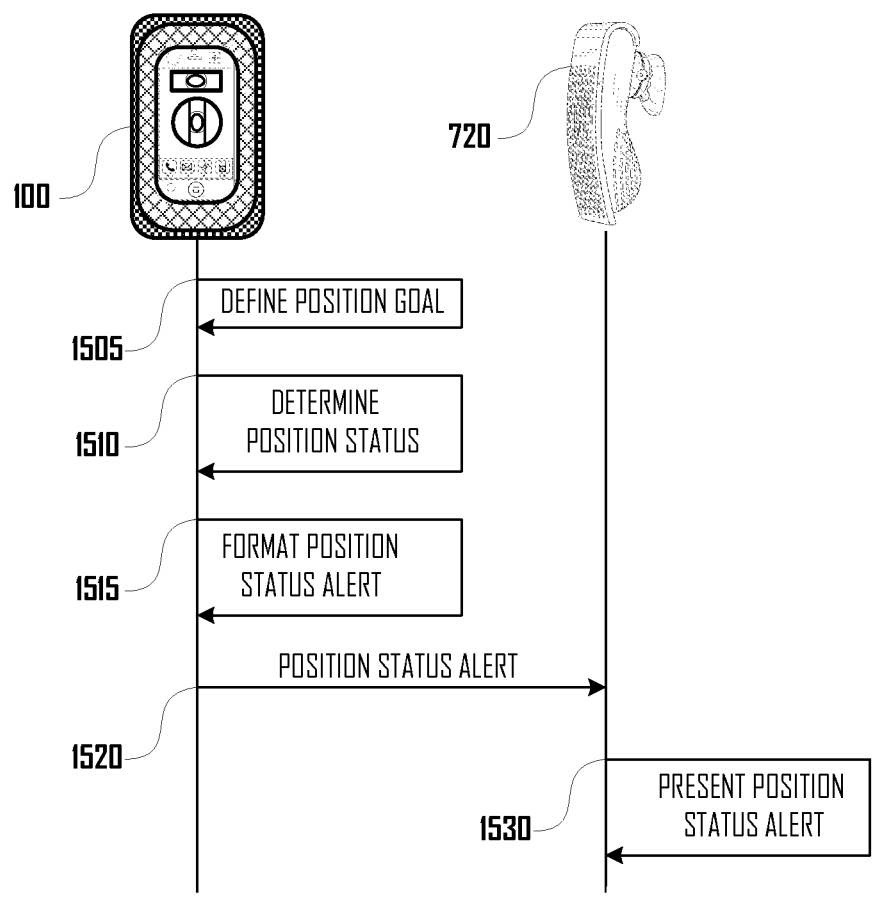
FIG. 15 is a diagram illustrating the actions taken by a leveling device and an audio device in accordance with various embodiments.

FIG. 15 is a diagram illustrating the actions taken by a leveling device 100 and an audio device 1020 in accordance with various embodiments. The actions begin where a goal position is defined 1505, and then position status is determined 1510, a position status alert is formatted 1515 and the position status alert is sent 1520 to the audio device 1020 where the position status alert is presented 1530.

In some embodiments a positioning goal may comprise a compass direction or GPS coordinate or be in relation thereto, and may be defined by an input device on the leveling device assembly 100 or be defined by a user device 1130 or an admin device 1110. Additionally, in various embodiments, the position alert may be formatted 1515 based on an obtained location or position of a user device 1130, admin device 1110, or audio device 1020.

Figure 16:
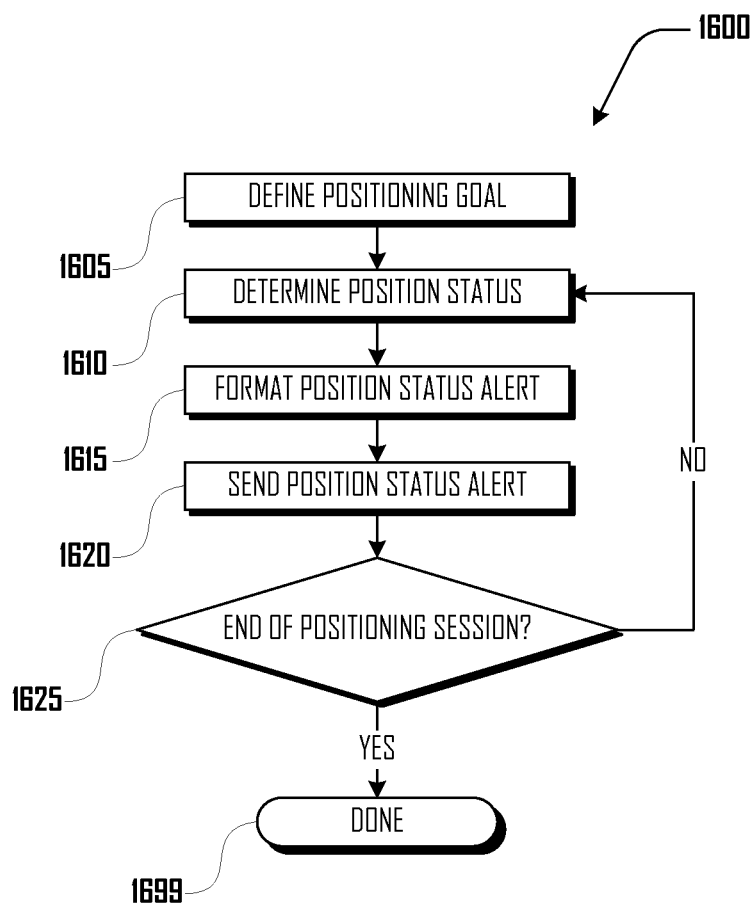
FIG. 16 is a flow diagram illustrating a positioning routine in accordance with various embodiments.

FIG. 16 is a flow diagram illustrating a positioning routine 1600 in accordance with various embodiments. The positioning routine 1600 begins in block 1605 where a positioning goal is defined, which may be defined via an input on the leveling device assembly 100, or remotely via a user device 1130 or admin device 1110. In further embodiments, a default positioning goal may be automatically defined as true level or to comprise true level.

In block 1610, a position status is determined, which may include degrees or percentage off from level, a GPS coordinate, a distance, and the like. In block 1615 a position status alert is formatted and in block 1620 a position status alert is sent 1620. A position status alert may be sent to another device, to a leveling light 120, a speaker 140, and the like.

In decision block 1625 a determination is made whether the positioning session has ended, and if the positioning session has ended the positioning routine 1600 ends in block 1699. However, if the positioning session is not ended, then the positioning routine 1600 cycles back to block 1610, where position status is again determined. In various embodiments, a positioning session may end when indicated by a user.

Figure 17:
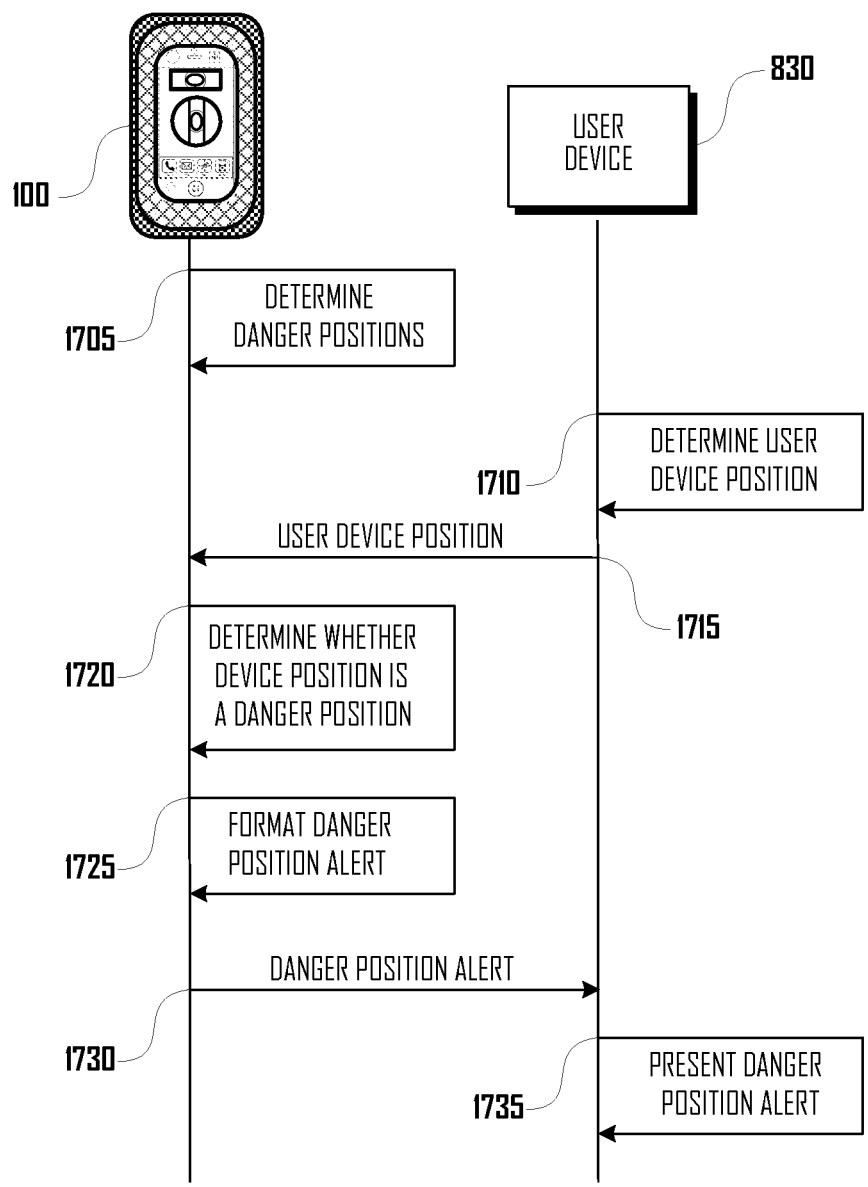
FIG. 17 is a diagram illustrating the actions taken by a leveling device and a user device in accordance with various embodiments.

FIG. 17 is a diagram illustrating the actions taken by a leveling device 100 and a user device 1130 in accordance with various embodiments. The actions begin where danger positions are determined 1705. A leveling device assembly 100 may be associated with various objects and such objects may have characteristics that make them dangerous, such as explosive, crushing, corrosive, and like properties. For example, a large sculpture being installed may need to be leveled, but may create a risk for users leveling and installing the sculpture, because it may fall and crush such a user. Accordingly, in such a situation, a danger zone may be defined as a radius or area around the sculpture, which may take into account center of gravity, height, weight, and the like. Such a defining may be automated or may be defined by a user.

Returning to the actions, the user device 1130 determines 1710 the position of the user device 1130, and the user device position is sent 1715 to the leveling device assembly 100, where a determination 1720 is made whether the device position is equal to a danger position or whether the device position is within a danger zone or area. A danger position alert is formatted 1725 and sent 1730 to the user device 1130, where the danger position alert is presented 1735.

In various embodiments, there may be a plurality of user devices 1130 and each user device 1130 may be sent 1730 the same danger position alert or a danger position alert may be custom formatted 1725 and sent 1730 each user device 1130 based on user device location and identity. For example, if a first user device 1130A is in a danger zone, the first user device 1130A may be sent 1730 a danger position alert such as "User Device A, you are in a danger zone!"; however, a second user device 1130B may not be sent 1730 a danger position alert or may be sent a danger position alert such as "Use device A is in a danger zone!" Accordingly, devices may be alerted to their own danger, to the danger of other devices, and the like.

Figure 18:
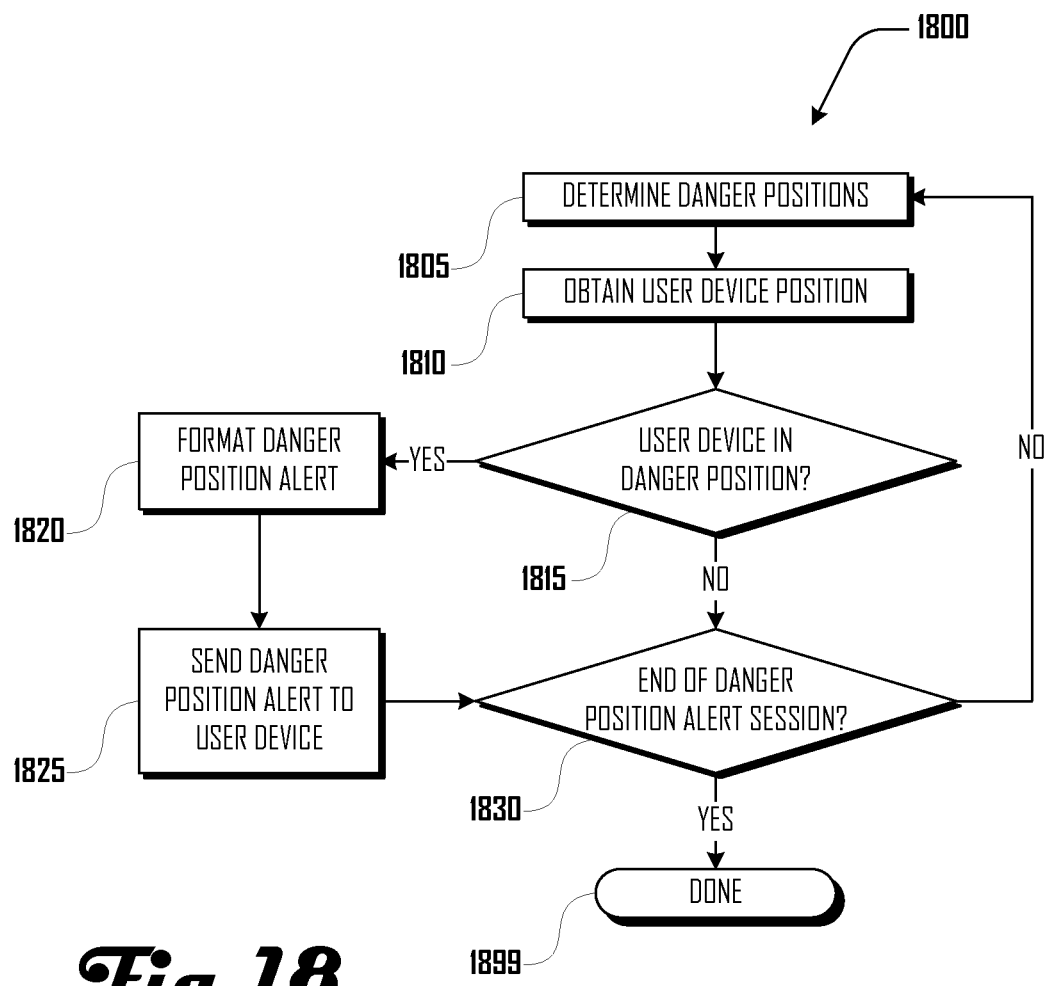
FIG. 18 is a flow diagram illustrating a device danger alert routine in accordance with various embodiments.

FIG. 18 is a flow diagram illustrating a device danger alert routine 1800 in accordance with various embodiments. The device danger alert routine 1800 begins in block 1805 where danger positions are determined, and in block 1810, a user device position is obtained.

In decision block 1815 a determination is made whether the user device 1130 is in a danger position. In various embodiments, such a determination may be made by comparing the obtained user device position to the defined danger positions. If the user device 1130 is not in a danger position the device danger alert routine 1800 continues to block 1830, where a determination is made whether the danger position alert session has ended. However, if the user device 1130 is in a danger position, then the device danger alert routine 1800 continues to block 1820, where a danger position alert is formatted. In block 1825 the danger alert is sent to the user device 1130.

In decision block 1830 a determination is made whether the danger position alert session has ended, and if so, the device danger alert routine 1800 is done in block 1899. However, if the danger position alert session is not ended, then the device danger alert routine 1800 cycles back to block 1805, where danger positions are again determined.

For example, in various embodiments, danger positions and user device positions can be continually determined and/or obtained. Danger positions may change as an object associated with the leveling device assembly 100 changes positions, or as the object associated with the leveling device assembly 100 changes level status. When it is determined that the user device 1130 is in a danger position, an alert can be formatted and sent to the user device 1130 so as to warn a user. This can be done continually in real time or at defined intervals during a danger position alert session.

Figure 19:
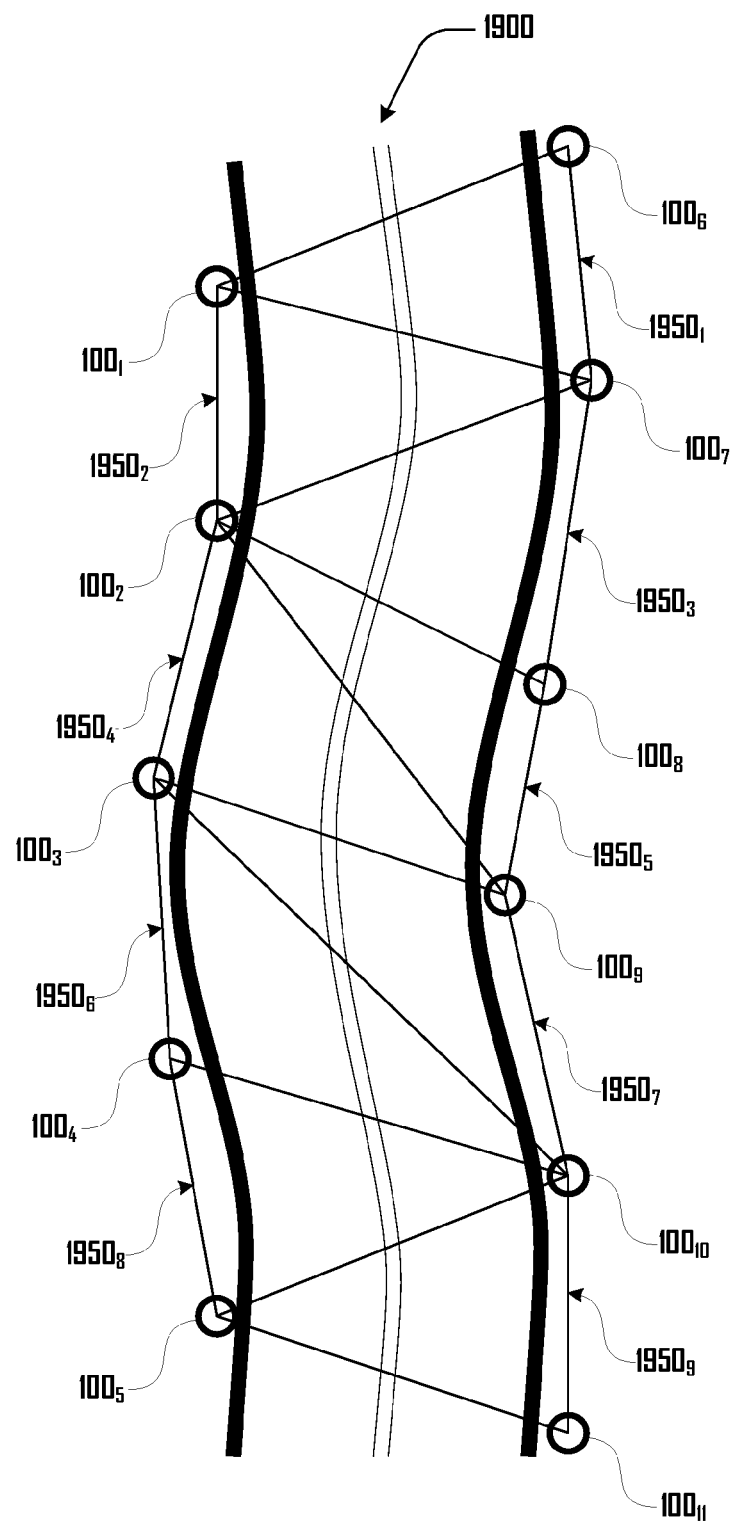
FIG. 19 is a top view of a road having a network of interconnected leveling devices positioned thereabout, which forms a positioning matrix.
Figure 20:
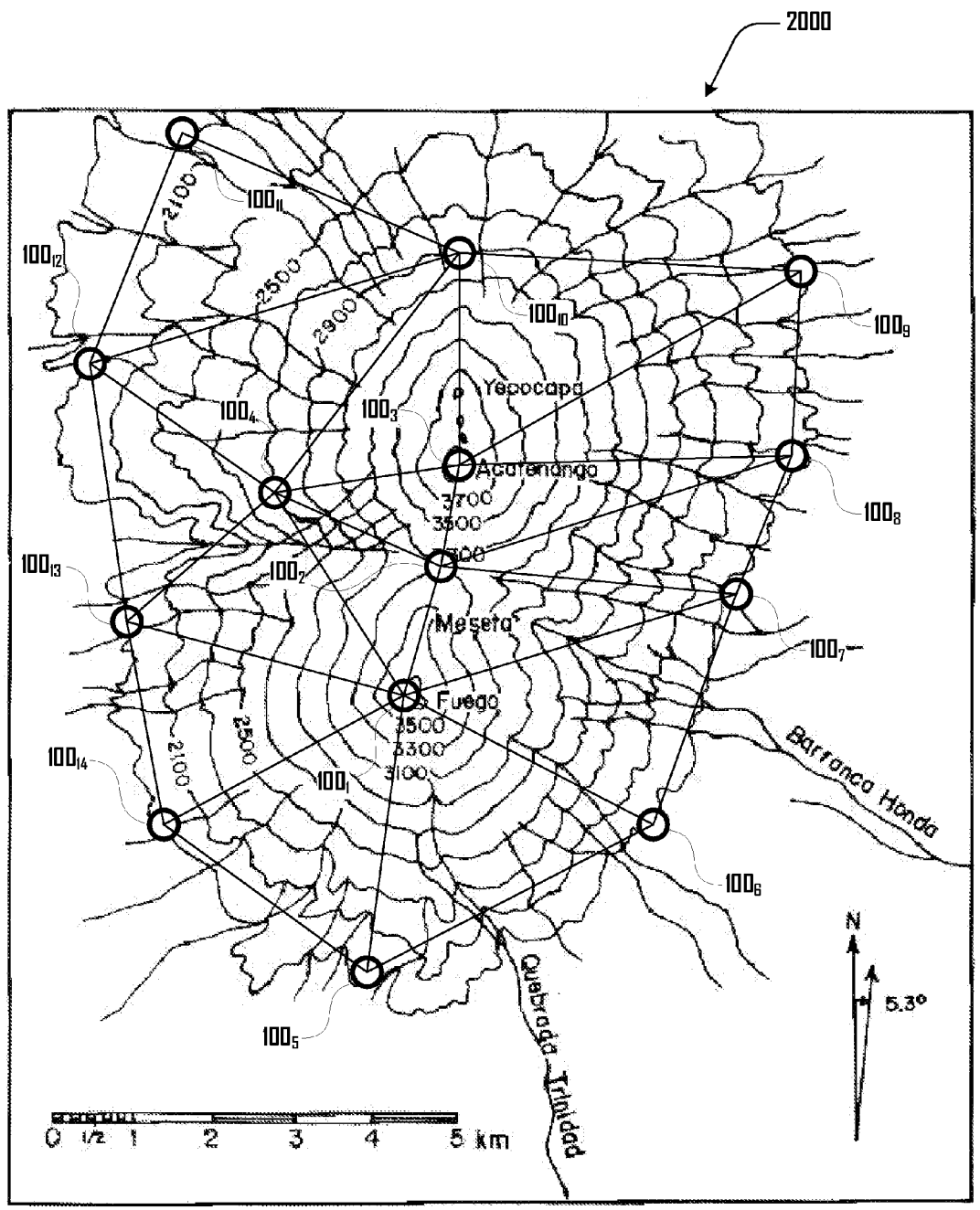
FIG. 20 is a top view of a mountain range having a network of interconnected leveling devices positioned thereabout, which forms a positioning matrix.

The following FIGS. 19, 20 and 21 depict various embodiments of leveling device assembly 100 networks, and uses thereof. In such embodiments, a network of leveling device assemblies 100 may be networked via a wireless network, and may also be connected to various other devices or servers via a wireless network, the internet, or the like.

FIG. 19 depicts a plurality of leveling device assemblies 100 positioned at various intervals along both sides of a road. Adjacent leveling devices form a plurality of triangular motion planes 1950, which may be used to model the movement of portions of the road and ground within each plane 1950 and which collectively form a matrix 1900. For example, motion plane 1950$_1$ is defined by imaginary lines connecting leveling device assemblies 100$_1$, 100$_6$, and 100$_7$. Motion plane 1950$_2$ is defined by imaginary lines connecting leveling device assemblies 100$_1$, 100$_2$, and 100$_7$.

Each leveling device assembly 100 may obtain positioning and level data, which may be used to model movement of each motion plane within the matrix 1900 and thereby model movement of the road and ground as a whole. Additionally data such as accelerometer data, and temperature data may also be obtained.

In an embodiment, data collected or modeled from a matrix 1900 can be presented to various users. For example, road signs may present images that reflect road conditions in real time, which may be based on data obtained from the matrix 1900. Additionally, such data collected from the matrix 1900 can be used by transportation agencies to determine when a road surface may need immediate repair or future repair.

Similarly, FIG. 20 depicts a matrix 2000 comprising a plurality of leveling device assemblies 100, which also forms a plurality of motion planes (not labeled). As shown in FIG. 20, the leveling device assemblies 100 are positioned in various locations on a mountain range, and the motion planes may be various shapes and sizes.

Accordingly, in an acute seismic event, or over time, the pitch and yawl of each plane may reveal a relationship between planes that may not otherwise be observable with other types of point measurement. A matrix 2000 as in FIG. 20 may be applied to locations with seismic activity to reveal shadows of tectonic interaction and movement that may not otherwise be observable by other seismic systems. Such measurements and modeling may be useful in the prediction of acute seismic events such as earthquakes.

In embodiments where leveling device assemblies 100 are positioned in and about the ground or ground features, a leveling device assembly 100 may housed within a hollow cylinder oriented perpendicular to the ground or the gravitational axis. Such cylinders may house the leveling device assembly 100 at, above, or below grade.

FIG. 21 depicts a plurality of leveling device assemblies 100 positioned at various points on a bridge. Here, each leveling device assembly 100 may provide positioning, leveling, seismic, and acceleration data, which may be associated or attributed to a portion, part or plane of the bridge on which the leveling device assembly 100 is positioned.

Accordingly, based on data obtained from the leveling device assemblies 100, modeling of the movement, strain, and position of the bridge may be achieved in various embodiments. For example, various parts of the bridge may be identified as being high or low strain areas, which may be correlated with traffic volume, or temperature changes. Such modeling may be used to determine areas or parts of the bridge that are in need of repair, or that need to be reinforced to prevent damage or catastrophic failure of the structure. In further embodiments, such a network of leveling device assemblies 100 may be applied to various structures.

Figure 22B:
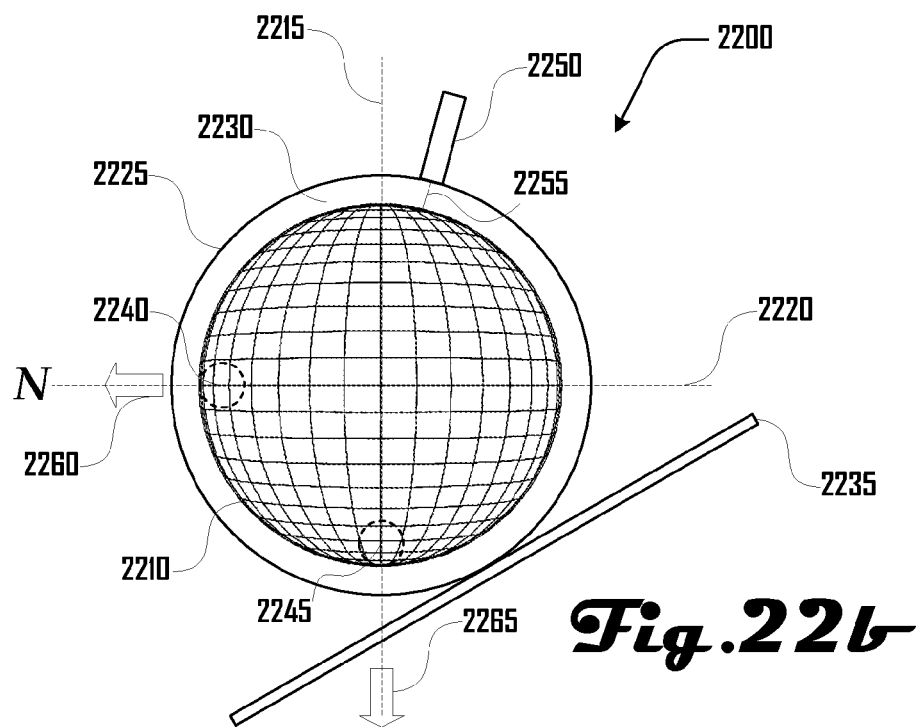

FIGS. 22a and 22b are a side view of a positioning sphere 2200 in accordance with various embodiments. FIG. 22a depicts the positioning sphere 2200 in a level position, and FIG. 22b depicts the positioning sphere in a non-level position. The positioning sphere 2200 comprises a data ball 2210, which is suspended in a suspension media 2230 and contained within a shell 2225. The data ball 2210 may rotate freely within the suspension media 2230 and shell 2225. Additionally, the shell 2225 is coupled to a leveling plate 2235, which is an extended substantially flat member.

In some embodiments, the surface of the data ball 2210 is encoded with data, which relates to a position on the data ball 2210. For example, the surface of the data ball 2210 may be encoded with data like a compact disc ("CD"), digital versatile disc ("DVD"), BlueRay disc, and the like, which can be read by the laser 2255 of a reader 2250. Accordingly, as the data ball 2210 rotates within the suspension media 2230, the change in position can be tracked as the reader 2250 reads the data that passes in view of the laser 2255.

In some embodiments, the data ball 2210 comprises a gravity body 2245, which is a body that is heavier than other portions of the data ball 2210 and therefore the gravity body 2245 is attracted to the earth's gravitational center via a gravitational force 2265. Accordingly, a vertical plane 2215 of the data ball 2210 is kept in alignment with the earth's gravitational center despite movement of the shell 2225 or structures attached thereto such as the leveling plate 2235.

In further embodiments the data ball 2210 comprises a compass body 2240, which is a magnetized body that is attracted to the earth's polar north. Accordingly, the compass body 2240 will be attracted to polar north via magnetic forces 2260 and a plane of the data ball 2210 will be aligned along a horizontal axis 2220 to magnetic north despite any change in position of the shell 2225 and structures attached thereto such as the leveling plate 2235.

FIG. 22a depicts the positioning sphere 2200 in a level position as indicated by the leveling plate 2235 being parallel to depicted horizontal axis 2220, and FIG. 22b depicts the positioning sphere in a non-level position, as indicated by the leveling plate 2235 not being parallel to depicted horizontal axis 2220. However, despite the leveling plate 2235 and shell 2225 being in a different position, the data ball 2210 retains the same orientation and alignment because the gravity body 2245 remains attracted to the earth's gravitational center via gravitational forces 2265, and the compass body 2240 remains oriented toward magnetic north via magnetic forces 2260.

In various embodiments, the position on the data ball 2210 being read in FIG. 22a by the reader 2250 may be considered a desired or zero position because the leveling plate 2235 is level, and the compass body 2240 naturally orients the data ball 2210 toward magnetic north. Accordingly, any changes in position from such a desired state may be tracked as the data ball 2210 rotates in relation to the reader 2250.

In some embodiments, the desired position may be changed. For example, a position wherein the leveling plate 2235 is perpendicular to level or any other orientation may be defined as a desired position or zero position.

Figure 24:
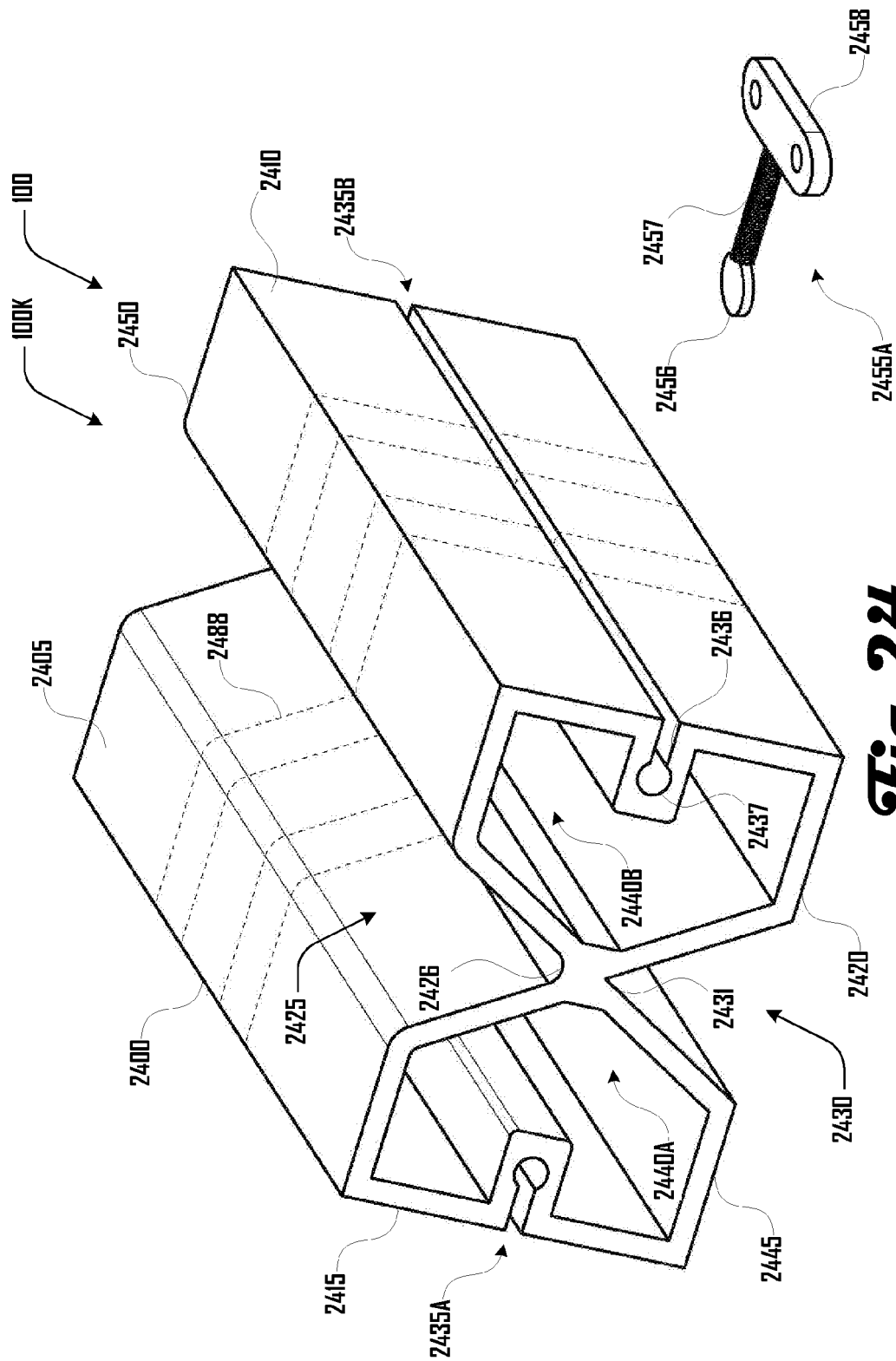
FIG. 24 shows a perspective view of a leveling device assembly in accordance with an embodiment.

FIG. 24 shows a perspective view of a leveling device assembly 100K in accordance with an embodiment. The leveling device assembly 100K comprises housing 2400, which may comprise a first, second, third and fourth face 2405, 2410, 2415, 2420. The first face 2405 may include an elongated sloped trench 2425, which extends from a first end 2445 to a second end 2450. The second and third faces 2410, 2415 may comprise an elongated coupling slot 2435A, 2435B respectively. The fourth face 2420 may include an angular notch 2430 that extends from the first end 2445 to the second end 2450. The housing 2400 may comprise one or more device cavity 2440A, 2440B.

In an embodiment, the housing 2400 may have a substantially cuboid profile aside from features such as the sloped trench 2425, angular notch 2430 and one or more coupling slot 2435A, 2435B. For example the first, second, third and fourth face 2405, 2410, 2415, 2420 and first and second end 2445, 2450 may have a substantially rectangular profile, and where the first, second, third and fourth face 2405, 2410, 2415, 2420 and first and second end 2445, 2450 are square to other and meet at a right angle. Such a configuration may be desirable in and embodiment because it makes each side of the leveling device assembly 100K operable to engage a planar surface so that the level status of the planar surface may be detected and indicated by the leveling device assembly 100K.

Additionally, in an embodiment, it may be desirable to detect the level status of objects that are non-planar, or to detect the level status of corners, or the like. Accordingly, in an embodiment, sloped trench 2425 and angular notch 2430 may make the leveling device assembly 100K operable to engage non-planar objects or features.

For example, the sloped trench 2425 may be configured to engage various sizes of cylindrical objects. The sloped trench 2425 may be uniform along its length extending from the first end 2445 to the second end 2450 and being aligned with a central axis of the first face 2405.

In an embodiment, the curve of the sloped trench 2425 may be a Witch of Agnesi curve having the Cartesian equation $y(x^2+a^2)=a^3$ or the parametric equation of $x=at$, $y=a/(1+t^2)$. The Witch of Agnesi curve may be desirable in some embodiments because it may provide stability when coupled with cylindrical objects, while providing the ability to couple with cylindrical, ovoid, or curved objects having a wide range of diameters. Although the Witch of Agnesi curve may be desirable in some embodiments, any other suitable curve or substantially curved profile may be employed in other embodiments.

The angular notch 2430 may be configured to engage angular objects and surfaces, such as a corner where planar faces meet. The angular notch 2430 may be uniform along its length extending from the first end 2445 to the second end 2450 and being aligned with a central axis of the fourth face 2420. In one embodiment, a notch central apex 2431 may define a 90° angle.

In some embodiments the angular notch 2430 and sloped trench 2425 may be on opposing faces of the housing 2400. Additionally, the angular notch 2430 and sloped trench 2425 may also be aligned in a similar plane. For example, a trench central apex 2426 of the sloped trench 2425 may be aligned with the notch central apex 2431 in a common location. In some embodiments, the angular notch 2430 and sloped trench 2425 may not be aligned or may not be on opposing faces.

One or more coupling slot 2435A, 2435B may be located on one or more face 2405, 2410, 2415, 2420. In an embodiment, coupling slots 2435A, 2435B may be an elongated slot that extends from the first end 2445 to the second end 2450. The coupling slots 2435A, 2435B may comprise a slot opening-passage 2436 and a slot inner-cavity 2437.

The slot opening-passage 2436 may be narrower than the slot inner-cavity 2437. For example, as depicted in FIG. 24, the slot opening-passage 2436 may be a substantially uniform rectangular opening, which extends inwardly and opens up into the slot inner-cavity 2437, which may be wider than the slot opening-passage 2436.

The leveling device assembly 100K may further include a coupling pin 2455A, which is configured to couple with the housing 2400 via coupling slots 2435A, 2435B. The coupling pin 2455A may comprise a coupling-pin head 2456, a coupling-pin shaft 2457, and a coupling-pin bow 2458. In an embodiment, the coupling-pin head 2456 is configured pass within the slot opening-passage 2436 in a first orientation and configured to couple within the slot inner-cavity 2437 in a second orientation. The coupling pin 2455A may be inoperable to pass within the slot opening-passage 2436 in the second orientation.

For example, the coupling-pin head 2456 may have a length that corresponds to the height of the slot inner-cavity 2437, and the coupling-pin head 2456 may have a width that corresponds to the height of the opening-passage 2436. When inserting the coupling pin 2455A into the slot opening-passage 2436 the coupling-pin head 2456 may be oriented such that the coupling-pin head 2456 may slide within the slot opening-passage 2436 and into the slot inner-cavity 2437. The coupling pin 2455A may then be rotated (e.g., 90°) such that the length coupling-pin head 2456 turns to engage the slot inner-cavity 2437. The coupling pin 2455A may thereby be coupled or held within a coupling slot 2435A, 2435B.

In an embodiment, the coupling of one or more coupling pin 2455A within one or more coupling slots 2435A, 2425B may facilitate the leveling device assembly 100K being secured to or coupled with various objects. For example, a first and second coupling pin 2455A may be coupled on opposing faces of the housing 2400 via coupling slots 2435A, 2425B, and an elastic band may extend between the first and second coupling pin 2455A. The elastic band may extended around various object (e.g., pipes, beams, or the like), such that the leveling device assembly 100K can be coupled or held thereto.

Figures 25A, 25B:
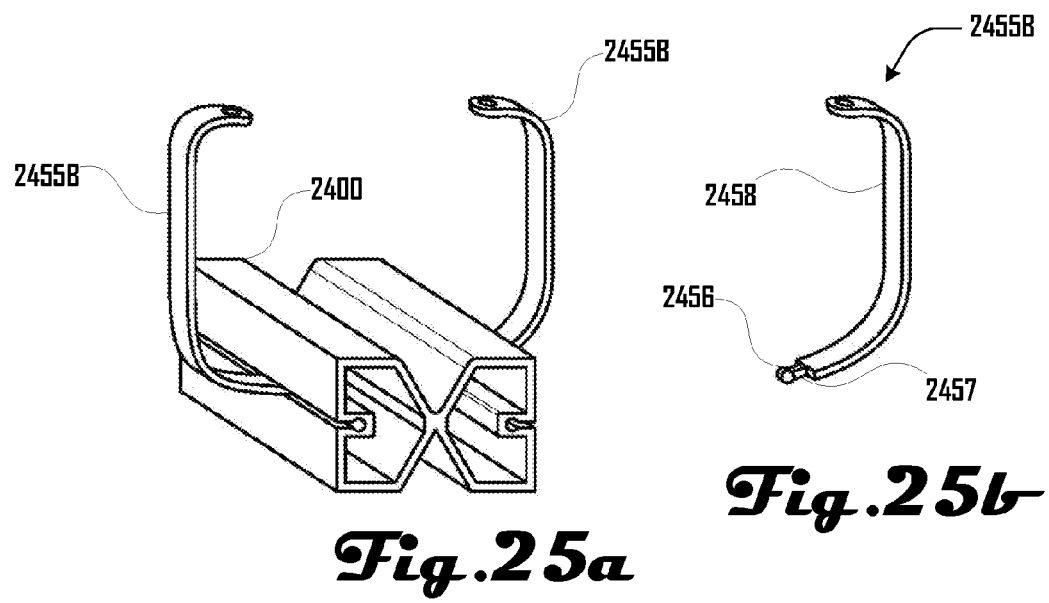
FIGS. 25a, 25b and 25c depict embodiments of a coupling pin and the leveling device assembly of FIG. 24.
Figure 25C:
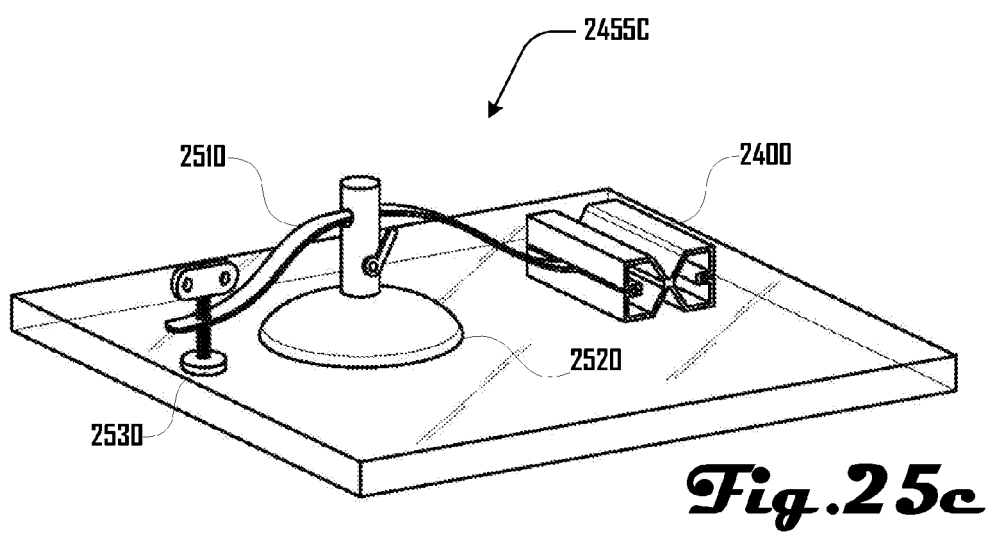

In other embodiments, a coupling pin 2455A may include additional features or structures, which provide for coupling of the leveling device assembly 100K to various objects. For example, FIGS. 25a, 25b and 25c depict embodiments of a coupling pin 2455B, 2455C and the leveling device assembly 100K of FIG. 24. For example, FIG. 25b depicts an embodiment of a coupling pin 2455B, which includes an extended coupling arm 2458. FIG. 25a depicts a first and second coupling pin 2455B coupled within coupling slots 2435A, 2425B (FIG. 24). The coupling arms 2458 of the first and second coupling pin 2455B may be operable to attach to various objects, such as a pipe, or the like.

In another embodiment, as depicted in FIG. 25c, the housing 2400 may be held against a surface by a suction coupling pin 2455C. The suction coupling pin 2455C may comprise a suction arm 2510, a suction cup 2520, and a soft shoe 2530 at a distal end of the suction arm 2510. For example, the suction coupling pin 2455C may be operable to couple with a surface such as glass, and allow the housing 2400 to be held thereto.

The housing 2400 may define one or more one or more device cavity 2440A, 2440B. For example, FIG. 24 depicts a first and second device cavity 2440A, 2440B, which extend from the first end 2445 to the second end 2450. In some embodiments, one or more first and second device cavity 2440A, 2440B may house a portion of a leveling device (not shown in FIG. 24), which may have any suitable components, features, abilities, or a combination thereof, as described herein in one or more embodiments. For example, a leveling device disposed within the housing 2400 may comprise various leveling, positioning, and acceleration functionalities. A leveling device disposed within the housing 2400 may comprise elements such as a compass, a leveling body, a global positioning system (GPS), an accelerometer, an electronic timing device, a compass device, an azimuth-finding device, a vector detecting device, image capturing device, audio recording device, and the like. However, in some embodiments, a leveling device 105 may lack one or more of these functionalities and related functional elements, and may merely be a processor or computer.

The housing 2400 may also be magnetic. For example, the housing may comprise a magnetic portion 2488 on any of the faces 2405, 2410, 2415, 2420 or ends 2445, 2450. In an embodiment, the housing 2400 may comprise a plurality of magnetic strips 2488 that may be oriented parallel or perpendicular to the axes of faces 2405, 2410, 2415, 2420 or ends 2445, 2450. In one embodiment, a plurality of magnetic strips 2488 may be disposed on the first face 2405, which at least extend from the second face 2410 to the third face 2415 and parallel to the first and second end 2445, 2450.

In some embodiments, corners where faces 2405, 2410, 2415, 2420 or ends 2445, 2450 meet may be rounded or truncated. For example, such a corner may be flatly, convexly, or concavely truncated. Such an embodiment may be desirable because it may allow the housing 2400 to be adaptable to engage with a wider variety of surfaces and object contours.

In some embodiments, caps (not shown) may be operable to cover and engage with the ends 2445, 2450. Such caps may include an extension of coupling slots 2435A, 2535B and my also conform to the profile of the ends 2445, 2450. In an embodiment, caps on the ends 2445, 2450 may provide a water-tight or air-tight seal between the device cavities 2440A, 2440B and the external environment. In an embodiment, caps on the ends 2445, 2450 may support a vacuum or positive pressure within the device cavities 2440A, 2440B with respect to the outside environment.

FIGS. 26a and 26b show perspective views of a leveling device assembly 100L in accordance with a further embodiment. The leveling device assembly 100L comprises a housing 2600, which may comprise a first, second, third and fourth face 2605, 2610, 2615, 2620. The first face 2605 may include an elongated sloped trench 2625, which extends from a first end 2645 to a second end 2650. The second and third faces 2610, 2615, or sidewalls, may comprise an elongated coupling slot 2635A, 2635B respectively. The fourth face 2620, or base, may comprise a squaring plate 2621 that is slidably coupled about the base 2620 and also comprise a base lip 2622.

Figure 27:
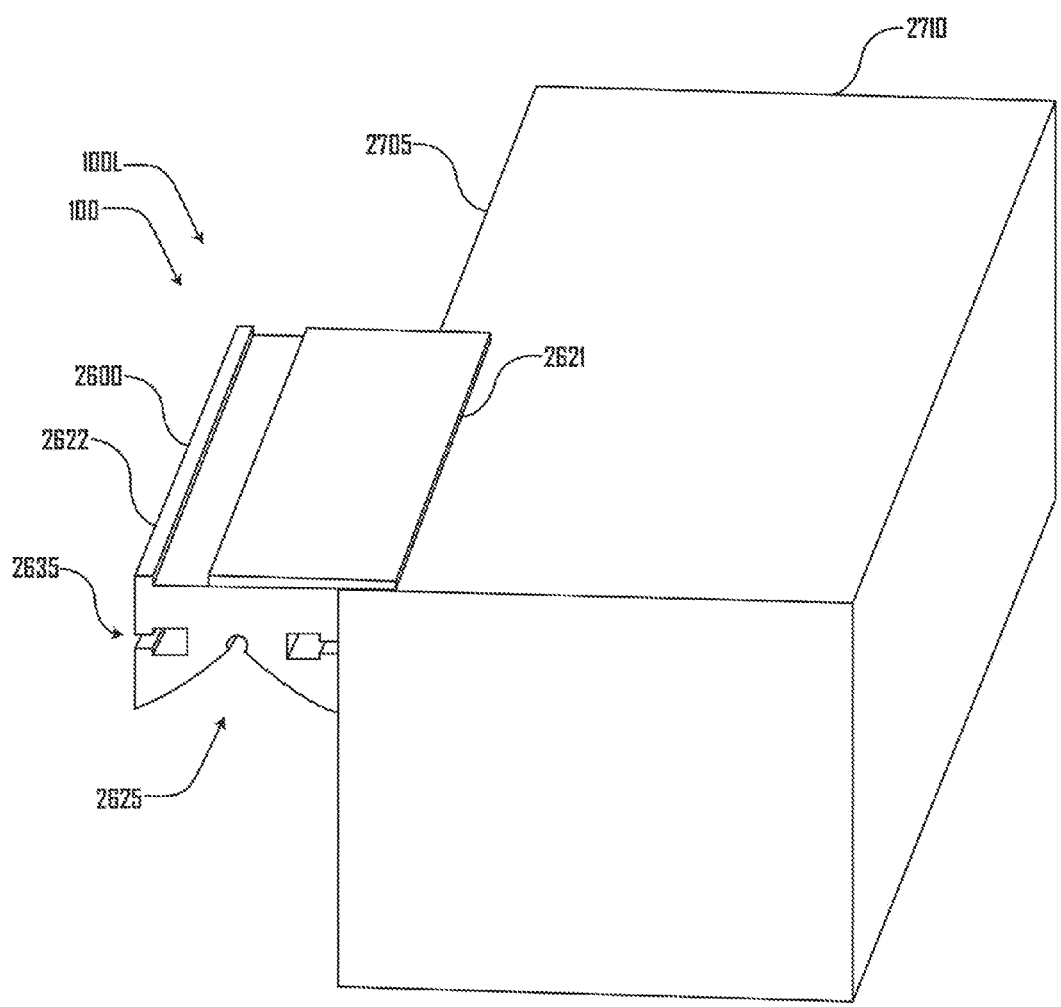
FIG. 27 depicts the device housing of FIGS. 26a and 26b coupled with an edge via an extended squaring plate of the device housing.

The squaring plate 2621 may be substantially planar and operable to assume an extended position wherein the squaring plate 2621 extends perpendicular to and past a face of at least one sidewall 2610, 2615 (e.g., as depicted in FIGS. 26a, 26b, 27 and 32a). The squaring plate 2621 may also be operable to assume a stowed position wherein the squaring plate 2621 is disposed between the sidewalls 2610, 2615 (e.g., as depicted in FIGS. 28a, 28b, 29b and 32b). In the extended configuration, the squaring plate 2621 and sidewall 2610 may define a squaring corner 2623, which as shown in FIG. 27, may be used to square the device 100L to an edge 2705 of an object 2710.

The squaring plate 2621 may be slidably coupled at the base 2620 via any suitable structure including a pin-in-slot configuration, or the like. In some embodiments, the squaring plate 2621 may be spring loaded. The squaring plate 2621 can be any suitable size in various embodiments, and may include any suitable edge. The squaring plate 2621 may also comprise one or more suitable material. For example, in some embodiments, the squaring plate 2621 may comprise a metal rail embedded in the front protruding edge of the body of the squaring plate 2621, which acts as a straightedge.

In an embodiment, the housing 2600 may have a substantially cuboid profile aside from features such as the sloped trench 2625 and one or more coupling slot 2635A, 2635B. For example the, sidewalls 2610, 2615 and base 2620 and first and second end 2645, 2650 may have a substantially rectangular profile, and where the, second, third and fourth face, 2610, 2615, 2620 and first and second end 2645, 2650 are square to each other and meet at a right angle. In a stowed configuration, the squaring plate 2621 and base lip 2622 may define a substantially contiguous base-face 2620 that extends between the sidewalls 2610, 2615 and between the first and second ends 2645, 2650. In various embodiments, however, the base lip 2622 may be absent and the squaring plate 2621 may define a substantially contiguous base-face 2620.

Such a cuboid and squared configuration may be desirable in an embodiment because it makes each side of the leveling device assembly 100L operable to engage a planar surface so that the level status of the planar surface may be detected and indicated by the leveling device assembly 100L.

Additionally, in an embodiment, it may be desirable to detect the level status of objects that are non-planar, or to detect the level status of corners, or the like. Accordingly, in an embodiment, the sloped trench 2625 may make the leveling device assembly 100L operable to engage non-planar objects or features.

For example, the sloped trench 2625 may be configured to engage various sizes of cylindrical objects as depicted in FIGS. 30 and 32a. The sloped trench 2625 may be uniform along its length extending from the first end 2645 to the second end 2650 and being aligned with a central axis of the first face 2605.

One or more coupling slots 2635A, 2635B may be located on one or more faces 2605, 2610, 2615, 2620. In a preferred embodiment, matching coupling slots 2635A, 2635B may be respectively disposed on the sidewalls 2610, 2615. In one embodiment, coupling slots 2635A, 2635B may be an elongated slot that extends from the first end 2645 to the second end 2650. The coupling slots 2635A, 2625B may comprise a slot opening-passage 2636 and a slot inner-cavity 2637.

The slot opening-passage 2636 may be narrower than the slot inner-cavity 2637. For example, as depicted in FIGS. 26a and 26b, the slot opening-passage 2636 may be a substantially uniform rectangular opening, which extends inwardly and opens up into the slot inner-cavity 2637, which may be wider than the slot opening-passage 2636.

In an embodiment, the sloped trench 2625 may define an elongated coupling slot 2626 disposed at the central apex of the sloped trench 2625. In some embodiments, the coupling slot 2626 of the sloped trench 2625 may have the same size and/or profile as the coupling slots 2635A, 2635B on the sidewalls 2610, 2615, but in some embodiments the size and/or profile may be different. For example, as depicted in FIGS. 26a and 26b, the coupling slots 2635A, 2635B may have a rectangular profile, whereas the coupling slot 2626 may have a circular profile.

The housing 2600 may define one or more device cavity (not shown). In some embodiments, the one or more device cavity may house a portion of a leveling device (not shown in FIG. 26), which may have any suitable components, features, abilities, or a combination thereof, as described herein in one or more embodiments. For example, a leveling device disposed within the housing 2600 may comprise various leveling, positioning, and acceleration functionalities. A leveling device disposed within the housing 2600 may comprise elements such as a compass, a leveling body, a global positioning system (GPS), an accelerometer, an electronic timing device, a compass device, an azimuth-finding device, a vector detecting device, image capturing device, audio recording device, and the like. However, in some embodiments, a leveling device may lack one or more of these functionalities and related functional elements, and may merely be a processor or computer.

The housing 2600 may also be magnetic. For example, the housing may comprise a magnetic portion 2688 on any of the faces 2605, 2610, 2615, 2620 or ends 2645, 2650. In an embodiment, the housing 2600 may comprise a plurality of magnetic strips 2688 that may be oriented parallel or perpendicular to the axes of faces 2605, 2610, 2615, 2620 or ends 2645, 2650. In one embodiment, a plurality of magnetic strips 2688 may be disposed on the first face 2605, which at least extend from the second face 2610 to the third face 2615 and parallel to the first and second end 2645, 2650.

In some embodiments, corners where faces 2605, 2610, 2615, 2620 or ends 2645, 2650 meet may be rounded or truncated. For example, such a corner may be flatly, convexly, or concavely truncated. Such an embodiment may be desirable because it may allow the housing 2600 to be adaptable to engage with a wider variety of surfaces and object contours.

In addition to appliances like a coupling pin 2455, coupling pin with extended arm 2455B, or suction coupling pin 2455C as depicted in FIGS. 24 and 25a-c (which are equally applicable to the housing 2600), various other appliances or accessories may be applied to and used with the housing 2600 (or housing 2400) in various embodiments.

Figure 28A:
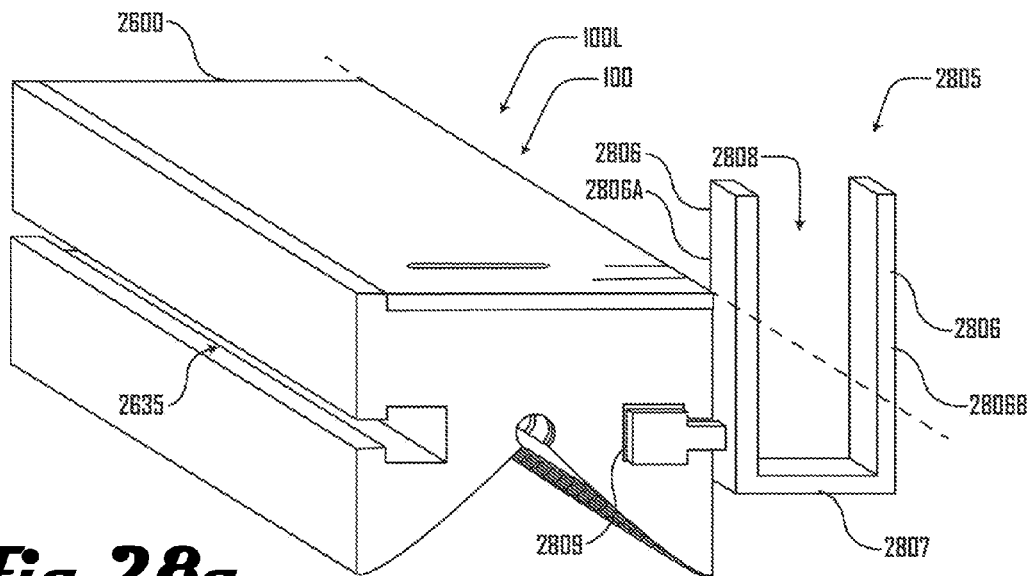
FIGS. 28a and 28b depict an embodiment of a coupling bracket coupled with the housing of FIGS. 26a and 26b.
Figure 28B:
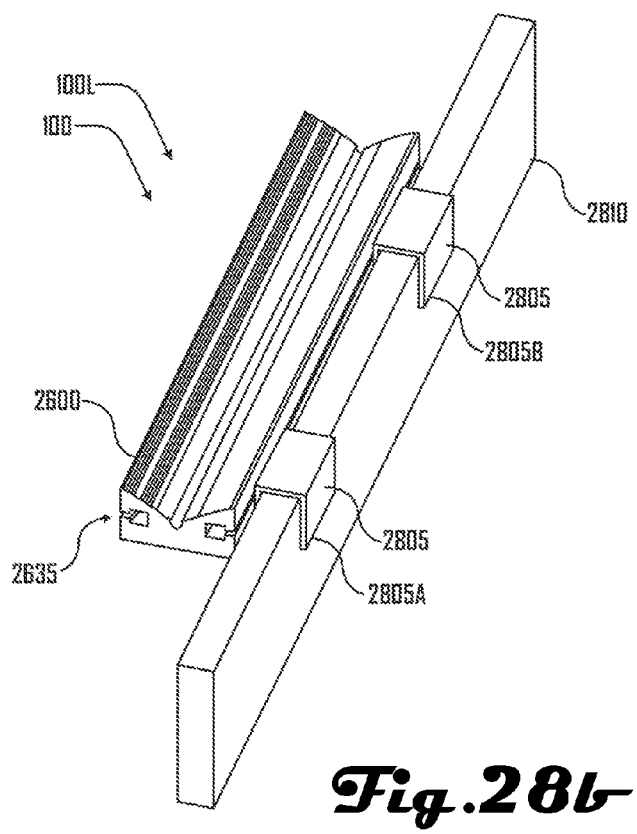

For example, FIGS. 28*a* and 28*b* depict a coupling bracket 2805 that includes a first and second arm 2808A, 2808B and span 2807 that define a coupling cavity 2808. The coupling bracket 2805 also includes a pin 2809 that is configured to couple with the coupling slots 2635 and in some embodiments with center coupling slot 2626. The pin 2809 may be operable to rotatably enter and couple with the slot 2635 along its length as described herein, or may be configured to only enter a slot 2635 at the first or second end 2645, 2650. In other words, the dimensions of the pin 2809 may not be configured for rotatable coupling via the length of a slot 3635 in some embodiments.

As depicted in FIG. 28*b*, for example, coupling brackets 2805A, 2805B may be configured to couple with dimensional lumber 2810 and thereby couple the housing 2600 to the dimensional lumber 2810 along a parallel axis. Use of one or a plurality of coupling brackets 2805 may be desirable. Accordingly, the generally U-shaped coupling cavity 2808 may be configured to correspond to various standard dimensional lumber sizes including 2-by, 4-by, and the like. In further embodiments, the arms 2806 and/or span 2807 may be configured to assume different sizes or may be elastic. Additionally, while the pin 2809 is depicted as being coupled to the first arm 2806A, it may alternatively be coupled with the span 2807, or may be coupled to any portion of the arms 2806 or span 2807 in any suitable configuration or orientation. Coupling brackets 2805 may also be configured to couple with various cuboid, circular, or irregularly shaped objects.

Figure 29A:
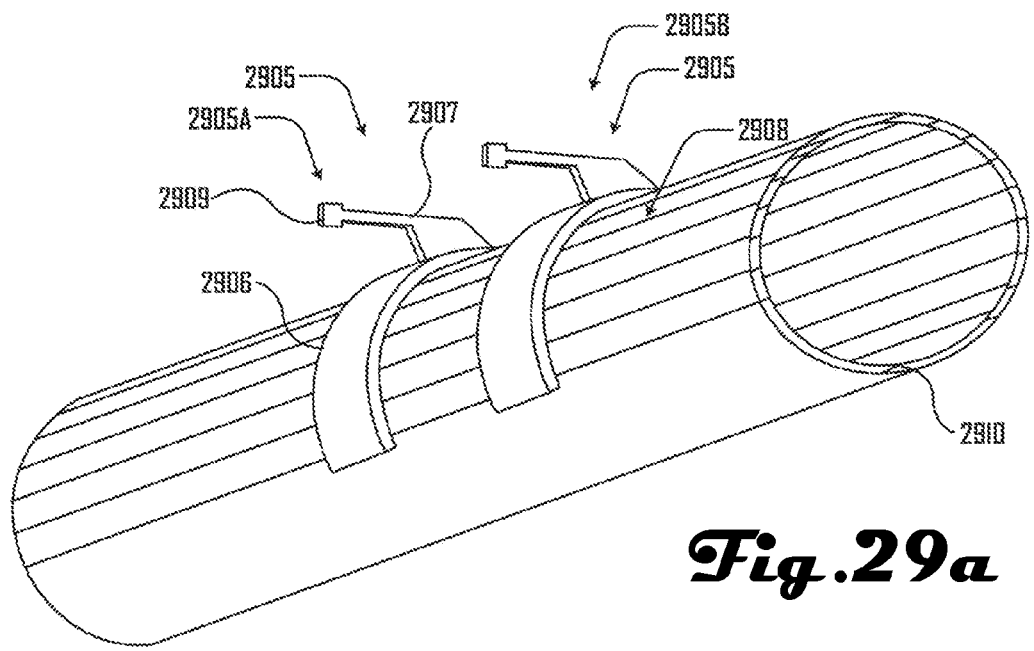
FIGS. 29a and 29b depict another embodiment of a coupling bracket coupled with the housing of FIGS. 26a and 26b.
Figure 29B:
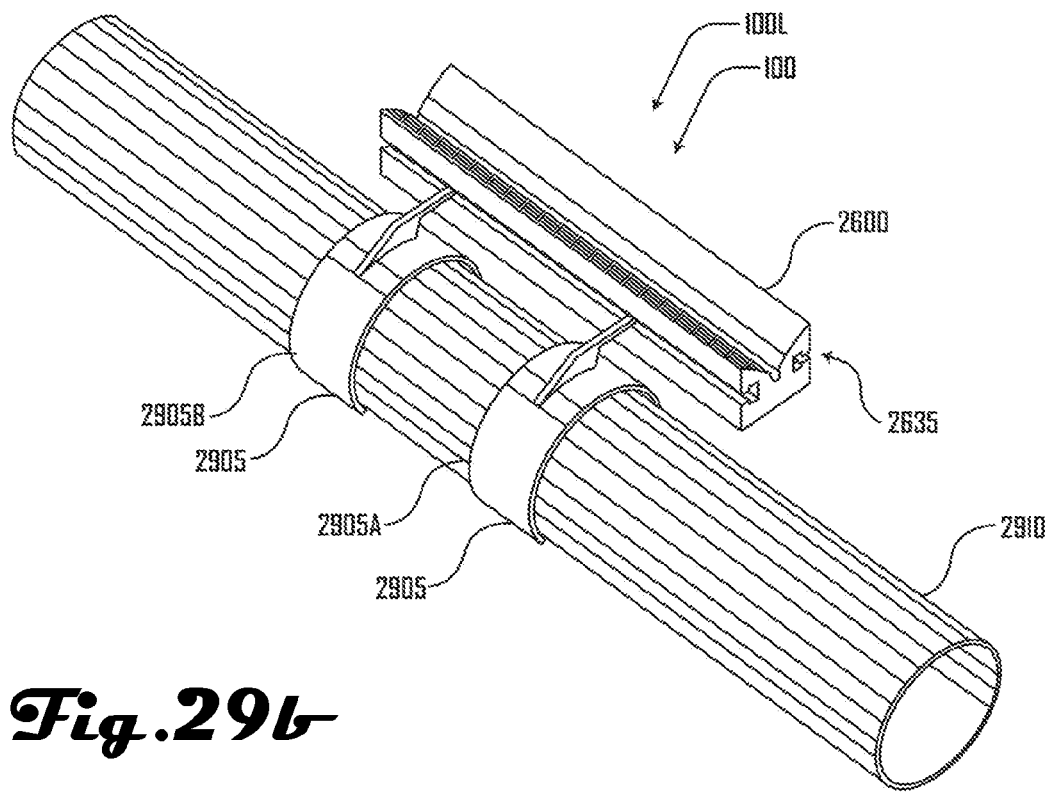

For example, FIGS. 29*a* and 29*b* depict a coupling bracket 2905 that is configured to couple with a circular pipe 2910. The coupling bracket 2905 comprises arms 2906 that define a crescent-shaped coupling cavity 2808 that is configured to couple with circular objects such as a pipe 2910. A limb 2907 extends from a portion of the arms 2906 and includes a coupling pin 2909 at a distal end, which is configured to couple with a coupling slot 2635 of the housing 2600 as discussed herein. In various embodiments, one or more coupling bracket 2905 may be used to couple the housing 2600 with an object.

The coupling bracket 2905 may be various suitable sizes to accommodate various sizes of circular, oval or other shaped objects. Additionally, in various embodiments, the arms 2906 of the coupling bracket 2905 may be elastic, magnetic, or comprise a surface is that is configured to provide for improved coupling with objects. For example, the arms 2906 may be elastic or biased toward the center of the coupling cavity 2908 to provide for gripping to an object. The arms 2906 may also comprise rubber, silicone, an adhesive or textured surface that provides for gripping to desired objects such as a pipe 2910. Additionally, while the limbs 2907 are shown configured to extend parallel to a tangent of the arms 2906, in further embodiments, the limbs 2907 may extend at various desirable angles or directions. The limbs 2907 may also be rotatably coupled to the arms 2906 so as to provide for customized extension direction of the limbs 2907.

Figure 30A:
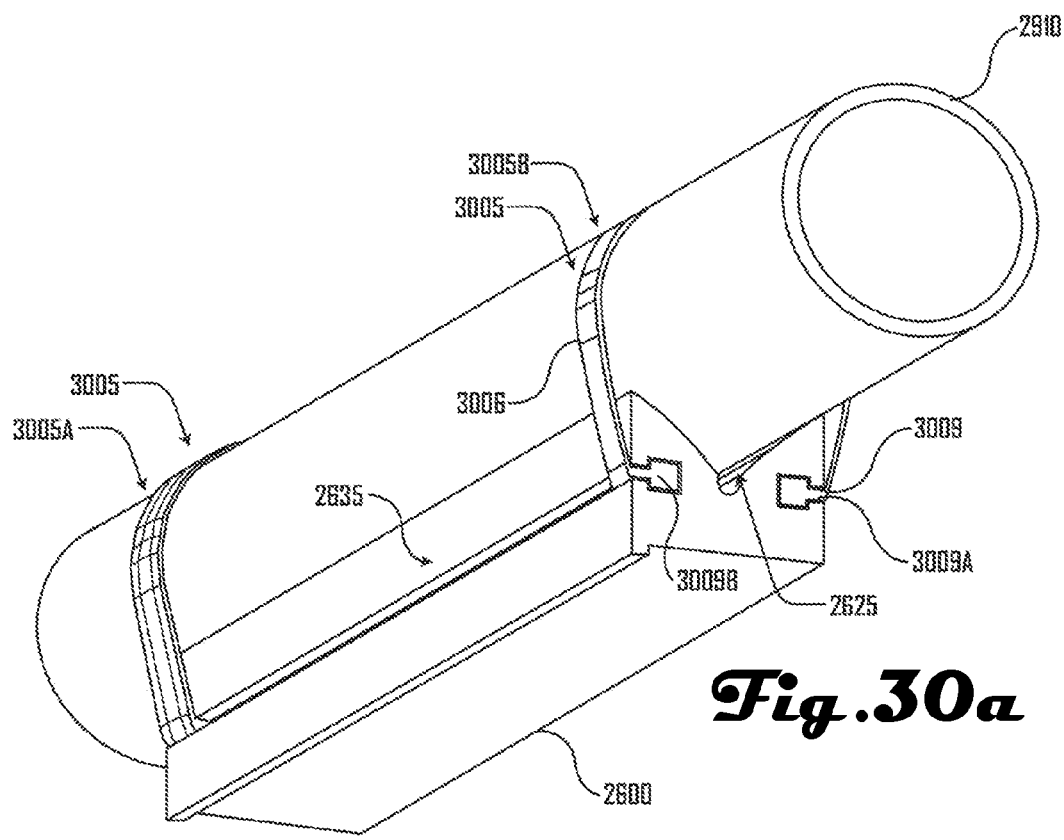
FIGS. 30a and 30b depict an embodiment of a coupling strap in accordance with an embodiment.
Figure 30B:
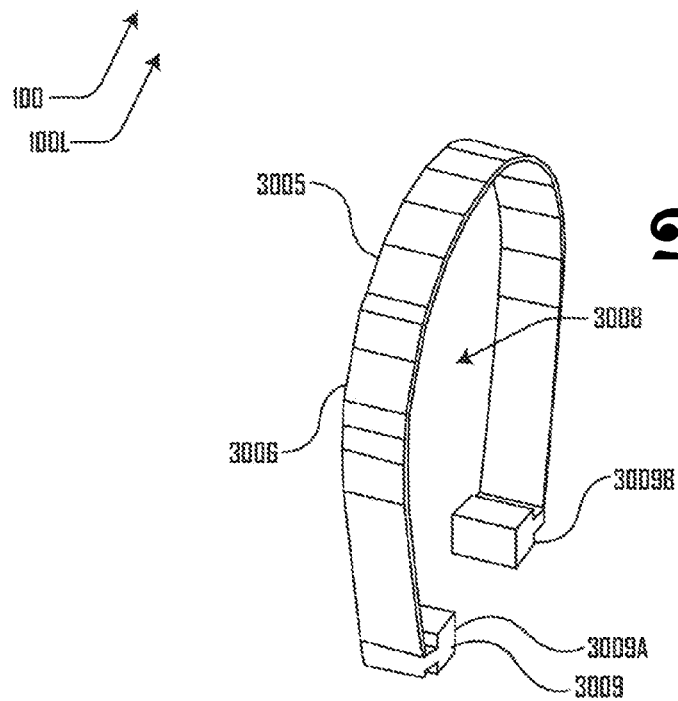

The housing 2600 may be coupled directly to objects in accordance with some embodiments. For example, FIGS. 30*a* and 30*b* depict a coupling strap 3005 that is operable to surround a portion of an object and thereby couple the housing 2600 to the object. The coupling strap 3005 comprises an elongated strap body 3006 with coupling pins 3009 on the ends of the strap 3006. The coupling pins 3009 may be configured to couple with coupling slots 2635 as discussed herein and thereby define a coupling loop 2908 that surrounds an object and thereby couples the housing 2600 to the object. For example, FIG. 30*a* depicts a pair of coupling straps 3005A, 3005B that are encircling a pipe 2910, with the pipe 2910 residing within the sloped trench 2625 defined by the housing 2600 and within the coupling loops 2908 defined by the respective straps 3005.

In various embodiments, a portion of the coupling strap 3005 may be elastic so the coupling strap 3005 can accommodate various sizes of objects and so that the object can be held securely within the sloped trench 2625, or against other faces of the housing 2600 such as the sidewalls 2410, 2415 or base 2420.

FIGS. 31*a-d* depict various embodiments 3105A, 3105B, 3105C of a coupling base 3105. The coupling base 3105 comprises a base member 3106 having a limb 3107 extending therefrom, with a coupling pin 3109 disposed at a distal end of the limb 3107. The coupling pin 3109 may be configured to couple with one or more coupling slot 2635 as discussed herein. In some embodiments, (e.g., 3105A, and 3105C, the base member 3106 may define one or more coupling holes 3108. In various embodiments, the coupling holes 3108 may be used to secure the base member 3106 to an object via screws, nails, or the like. In further embodiments, the base member 3106 may couple with desired objects in other ways. For example FIG. 31*c* depicts a coupling base 3105B having a magnet 3111. In further embodiments, a coupling base 3106 may include an adhesive, suction cup, hook, stake, or other desirable coupling structure.

In various embodiments, (e.g., 3105A, and 3105B) the limb 3107 and pin 3109 may be configured to couple the housing 2600 substantially parallel to the coupling base 3106, however, in some embodiments (e.g., 3105C), the limb 3107 and pin 3109 may be configured to couple the housing 2600 at an angle that is not parallel to the coupling base 3106. In some embodiments, such a coupling orientation or angle may be static; however, in other embodiments, the limb 3107 and/or pin 3109 may be rotatably coupled to the coupling base 3106 such that a desired orientation of the housing 2600 may be achieved. For example, the angle of the housing 2600 relative to the base 3106 may be configured, or the rotation orientation of the housing 2600 at a given angle may be configured.

As discussed herein (and as depicted in FIG. 3*a*, for example), a housing 2600 or leveling device 100 may comprise one or more laser assembly 3215 that is configured to project a laser 3220 coincident with an axis of the housing 2600. FIG. 23*a* depicts a housing 2600 that comprises a laser assembly 3215 that is configured to project a laser 3220A extending from the first end 3245 of the housing 2600 that is coincident with a housing axis extending between the first and second end 3245, 3250. A second laser 3220B is depicted being projected from the second end 3250 by a second laser assembly (not shown). Such a configuration may be desirable because the lasers 3220 may represent an axis that is parallel to an axis of an object associated with the housing 2600 (e.g., the pipe 2910 disposed in the sloped trench 2625 of the housing 2600). The configuration of laser assemblies 3215 depicted in FIG. 32*a* is only an example, and as discussed herein, lasers 3220 may be projected from any suitable portion of the housing 2600 and may represent various suitable axes.

FIG. 32*b* depicts a housing 2600 with a removable laser appliance 3205 coupled to the housing 2600 via the coupling slot 2626 at the center of the sloped trench 2625. The laser appliance 3205 comprises a laser appliance body 3206 that conforms to the walls of the sloped trench 2625 and includes a coupling pin 3209 that is configured to couple within the coupling slot 2626 as described herein. A laser assembly 3215 is disposed on a top end of the body 3206 and is configured to project a first and second laser toward and past the first and second ends 3245, 3250 respectively, along a common axis that is coincident with an axis of the housing 2600. In some embodiments, the laser assembly 3215 may be disposed in any suitable portion of the body 3206 including at a central location or as a portion of the pin 3209. In some embodiments, a laser appliance 3205 may be configured to couple with the housing 2600 in other places. For example, a laser appliance may couple within or about one or more of the coupling slots 2635 on the sidewalls 2610, 2615 of the housing 2600.

Housings 2400, 2600 are shown as example embodiments of housings in accordance with the present invention; however, these example housings 2400, 2600 should not be construed to limit the many variations of these housings that are within the scope and spirit of the present invention. For example, any of the disclosed portions of the housings 2400, 2600 may be absent, in plural, or interchanged among embodiments as desired. Disclosure related to one embodiment is equally applicable to disclosure related to another embodiment. Appliances discussed herein may also be adapted to any suitable housing embodiment.

Additionally, although specific embodiments have been illustrated and described herein, it will be appreciated by those of ordinary skill in the art and others, that a wide variety of alternate and/or equivalent implementations may be substituted for the specific embodiment shown in the described without departing from the scope of the embodiments described herein. This application is intended to cover any adaptations or variations of the embodiment discussed herein. While various embodiments have been illustrated and described, as noted above, many changes can be made without departing from the spirit and scope of the embodiments described herein.

The invention claimed is:

1. A leveling device assembly comprising:
    a rigid housing comprising:
        a pair of opposing sidewalls that are substantially parallel to each other;
        a first and second end substantially square to the opposing sidewalls;
        an elongated sloped trench disposed between the sidewalls extending from the first end to the second end and including a central apex substantially equidistant between the sidewalls;
        a substantially planar squaring plate disposed at a base opposing the elongated sloped trench and substantially square to the sidewalls; and
        an elongated coupling slot disposed at the central apex of the sloped trench and;
        at least one device cavity defined by the housing, and
    a leveling device disposed within the at least one device cavity, the leveling device operable to detect the level status of at least one axis defined by at least one of the faces or ends.

2. The leveling device assembly of claim 1, wherein the sloped trench comprises a central apex substantially equidistant between the sidewalls.

3. The leveling device assembly of claim 1, further comprising an elongated coupling slot on at least one sidewall.

4. The leveling device assembly of claim 3, wherein the elongated coupling slot extends substantially from the first end to the second end.

5. The leveling device assembly of claim 1, wherein the squaring plate is slidably coupled at the base and operable to move perpendicular to the sidewalls.

6. The leveling device assembly of claim 1,
    wherein the squaring plate is operable to assume a stowed position wherein the squaring plate is disposed between the sidewalls, and
    wherein the squaring plate is configured to assume an extended position wherein the squaring plate extends perpendicular to and past a face of at least one sidewall.

7. The leveling device assembly of claim 1, further comprising a base-lip disposed at the base that that extends from the first end to the second end and defines a portion of a sidewall.

8. The leveling device assembly of claim 7, wherein the base-lip is substantially the same thickness as the squaring plate.

9. The leveling device assembly of claim 1, further comprising a respective elongated coupling slot on each of the sidewalls.

10. The leveling device assembly of claim 9, further comprising a generally U-shaped coupling apparatus configured to be removably coupled within either of the elongated coupling slots.

11. The leveling device assembly of claim 9, further comprising a generally C-shaped coupling apparatus configured to be removably coupled within either of the elongated coupling slots.

12. The leveling device assembly of claim 9, further comprising an elongated coupling apparatus having:
    a first end configured to be removably coupled within either of the elongated coupling slots,
    a second end configured to be removably coupled within either of the elongated coupling slots, and
    elongated strap member extending between the first and second ends.

13. The leveling device assembly of claim 9, further comprising an elongated coupling apparatus having a first end configured to be removably coupled within either of the elongated coupling slots, a second end configured to be removably coupled to the face of a surface.

14. The leveling device assembly of claim 1, further comprising a laser assembly configured to project a laser coincident to an axis of the leveling device assembly housing.

15. The leveling device assembly of claim 1, further comprising a laser assembly configured to be removably coupled within an elongated coupling slot disposed at the central apex of the sloped trench.

16. A leveling device assembly comprising:
    a rigid housing comprising:
        a pair of opposing sidewalls that are substantially parallel to each other;
        a first and second end substantially square to the opposing sidewalls;
        an elongated sloped trench disposed between the sidewalls extending from the first end to the second end;
        a substantially planar squaring plate disposed at a base opposing the elongated sloped trench and substantially square to the sidewalls;
        a base-lip disposed at the base that that extends from the first end to the second end and defines a portion of a sidewall, the base-lip being substantially the same thickness as the squaring plate; and at least one device cavity defined by the housing, and
a leveling device disposed within the at least one device cavity, the leveling device operable to detect the level status of at least one axis defined by at least one of the faces or ends,
wherein the base-lip and squaring plate define a substantially contiguous base-face that extends between the sidewalls and between the first and second ends.

* * * * *